(12) United States Patent
Bryant et al.

(10) Patent No.: US 11,215,628 B2
(45) Date of Patent: Jan. 4, 2022

(54) METHODS OF AUTOMATIZED SAMPLE LOADING AND PROCESSING AND DEVICES AND SYSTEMS RELATED THERETO

(71) Applicant: Abbott Molecular Inc., Des Plaines, IL (US)

(72) Inventors: Jason E. Bryant, Eliot, ME (US); Brett W. Johnson, Naperville, IL (US); Richard J. Schoon, Southborough, MA (US)

(73) Assignee: Abbott Molecular Inc., Des Plaines, IL (US)

( * ) Notice: Subject to any disclaimer, the term of this patent is extended or adjusted under 35 U.S.C. 154(b) by 353 days.

(21) Appl. No.: 16/013,758

(22) Filed: Jun. 20, 2018

(65) Prior Publication Data
US 2018/0372768 A1     Dec. 27, 2018

Related U.S. Application Data

(60) Provisional application No. 62/523,058, filed on Jun. 21, 2017.

(51) Int. Cl.
| | |
|---|---|
| *G01N 35/10* | (2006.01) |
| *B01L 3/00* | (2006.01) |
| *B01L 7/04* | (2010.01) |
| *G01N 35/00* | (2006.01) |
| *G01N 35/04* | (2006.01) |
| *G06K 9/00* | (2006.01) |

(52) U.S. Cl.
CPC ... *G01N 35/1083* (2013.01); *G01N 35/00732* (2013.01); *G01N 35/04* (2013.01); *G01N 35/1065* (2013.01); *G06K 9/00771* (2013.01); *G01N 35/1079* (2013.01); *G01N 2035/00752* (2013.01); *G01N 2035/0412* (2013.01)

(58) Field of Classification Search
None
See application file for complete search history.

(56) References Cited

U.S. PATENT DOCUMENTS

| | | | |
|---|---|---|---|
| 7,846,384 | B2 | 12/2010 | Watson et al. |
| 8,859,289 | B2 | 10/2014 | Marty et al. |
| 9,377,383 | B2 | 6/2016 | Nagai et al. |
| 2008/0056958 | A1 | 3/2008 | Vijay et al. |
| 2012/0051987 | A1 | 3/2012 | Johnson et al. |
| 2013/0123979 | A1 | 5/2013 | Elliot et al. |
| 2013/0137110 | A1 | 5/2013 | Kraihanzel |
| 2013/0148883 | A1 | 6/2013 | Lee |
| 2015/0339438 | A1 | 11/2015 | Oeltjen |
| 2015/0346229 | A1 | 12/2015 | Furrer et al. |

(Continued)

FOREIGN PATENT DOCUMENTS

| | | | |
|---|---|---|---|
| EP | 2952905 | 12/2015 | |
| EP | 2952905 A1 * | 12/2015 | ............. G01N 35/04 |
| WO | 2013/070744 | 5/2013 | |

*Primary Examiner* — Kathryn Wright
(74) *Attorney, Agent, or Firm* — Edward J. Baba; Mandar A. Joshi; Bozicevic, Field & Francis LLP

(57) ABSTRACT

Provided are methods for the automated loading and/or automatic processing of one or more samples in an automated sample processing device. Also provided are automated sample loading systems and devices that include automated sample loading systems or devices that are utilized in such systems.

33 Claims, 12 Drawing Sheets

(56) References Cited

U.S. PATENT DOCUMENTS

| | | |
|---|---|---|
| 2016/0025756 A1 | 1/2016 | Pollack et al. |
| 2016/0077118 A1* | 3/2016 | Silbert ............. G01N 35/00732 436/180 |
| 2016/0124006 A1 | 5/2016 | Pedain |
| 2016/0328588 A1* | 11/2016 | Hagen ................ G06K 7/10861 |
| 2017/0022502 A1 | 1/2017 | Dickson et al. |
| 2017/0022504 A1 | 1/2017 | Lee et al. |
| 2017/0022588 A1 | 1/2017 | Tang et al. |
| 2017/0022597 A1 | 1/2017 | Strobel et al. |
| 2017/0022601 A1 | 1/2017 | Dieguez-Campo et al. |
| 2017/0022603 A1 | 1/2017 | Ivanov et al. |
| 2017/0153260 A1* | 6/2017 | Barmettler ........... G01N 35/026 |

* cited by examiner

FIG. 14
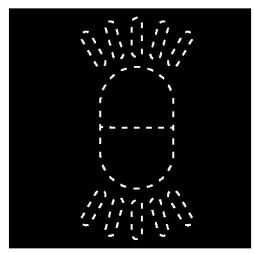 Open lane
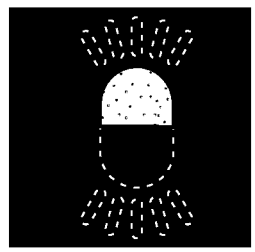 Rack properly placed on shelf and waiting to be scanned
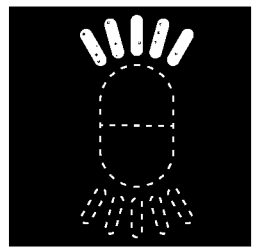 Rack processed. Ready for removal
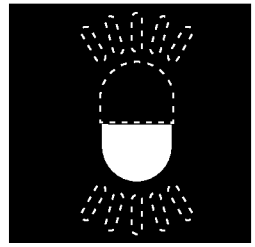 Do not use lane
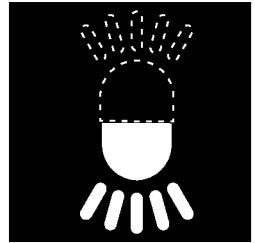 Rack placed in busy lane
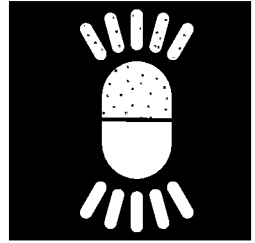 Error. See screen for further instructions.

METHODS OF AUTOMATIZED SAMPLE LOADING AND PROCESSING AND DEVICES AND SYSTEMS RELATED THERETO

CROSS-REFERENCE TO RELATED APPLICATIONS

Pursuant to 35 U.S.C. § 119(e), this application claims priority to the filing date of the U.S. Provisional Patent Application Ser. No. 62/523,058, filed Jun. 21, 2017, the disclosure of which application is herein incorporated by reference.

BACKGROUND

Molecular diagnostic assays, including nucleic acid amplification based methods, have become a mainstay of clinical medicine and the variety of available tests and the demand for such tests by clinicians has increased dramatically. This demand places increasing pressures on clinical laboratories to process, not only a greater volume of samples, but also a greater diversity of tests on the samples.

To perform molecular diagnostic assays in an automated sample processing instrument, patient samples as well as control samples must be loaded into the instrument and tracked throughout the processing. The variability in the assays that may be requested, variability in the type of sample tubes that may arrive in a diagnostic laboratory and variability in the length of processing time for each assay complicates sample loading and tracking. For example, a number of different assays, i.e., assays to detect different analytes, may arrive at a diagnostic testing facility at any one time. In addition, the containers in which the samples arrive may be of different sizes and shapes. Furthermore, a laboratory may have already begun processing samples through an assay of extended length when samples arrive in the facility that should only require a minimal time for processing. All of these scenarios, in isolation or combination, add increasing complexity to processes of sample loading in multiplexed molecular diagnostic devices.

SUMMARY

Provided are methods for the automated loading and/or automatic processing of one or more samples in an automated sample processing device. Also provided are automated sample loading systems and devices that include automated sample loading systems or devices that are utilized in such systems.

Aspects of the present disclosure include a sample loading system comprising: a plurality of paired external and internal sample loading positions each dimensioned to receive a sample rack having a slot dimensioned to receive a sample container; a plurality of tracks each linking the external sample loading position to the internal sample loading position of each pair; a camera connected to a conveyor that conveys the camera to an imaging position adjacent to each track such that the camera generates an image of the sample container when present in the slot; and a computing device, operably connected to the camera, comprising a non-transitory computer readable medium storing instructions that, when executed by the computing device, cause the computing device to determine from the image: a) the type of sample container present in the slot; b) the size of the sample container present in the slot; c) whether the sample container is capped or uncapped; or d) a combination thereof.

In some embodiments, the sample rack comprises a plurality of slots each dimensioned to receive a sample container. In some embodiments, the camera generates an image of each sample container, if present, in each of the plurality of slots during transport of the sample rack. In some embodiments, the conveyor pauses the transport of the sample rack during the generation of the image. In some embodiments, the sample rack comprises a removable part. In some embodiments, the non-transitory computer readable medium further stores instructions that, when executed by the computing device, cause the computing device to determine from the image whether the removable part is present or absent. In some embodiments, the removable part is a cap retention bar. In some embodiments, the sample loading system further comprises a user access barrier. In some embodiments, the user access barrier comprises a comb structure through which each rack passes during transport between the external loading position and the internal loading position. In some embodiments, external loading positions are present on a loading shelf that pivots between a closed loading position and an open loading position. In some embodiments, the loading shelf further comprises a loading shelf position indicator. In some embodiments, the non-transitory computer readable medium further stores instructions that, when executed by the computing device, cause the computing device to determine which of the plurality of slots contain a sample container. In some embodiments, the slot comprises a plurality of spring arms that center the sample container in the slot. In some embodiments, the slot comprises an internal ridge. In some embodiments, the internal ridge is dimensioned to prevent a container having a maximum bottom diameter above a threshold from contacting the bottom of the slot. In some embodiments, the internal ridge is dimensioned to allow a container having a maximum bottom diameter below a threshold to contact the bottom of the slot. In some embodiments, the internal ridge comprises a wire affixed to an internal wall of the slot. In some embodiments, the sample loading system comprises a barcode reader. In some embodiments, the barcode reader scans a barcode, when present, on the sample rack. In some embodiments, the barcode reader scans a barcode, when present, on the sample container. In some embodiments, In some embodiments, the barcode reader is operably connected to a computing device comprising a non-transitory computer readable medium storing instructions that, when executed by the computing device, cause the computing device to obtain data from the barcode. In some embodiments, the data obtained from the barcode comprises sample information, assay information, or both. In some embodiments, the camera serves as the barcode reader. In some embodiments, a wall of the slot comprises a gap through which the camera images the sample container. In some embodiments, each external sample loading position further comprises a sensor that detects the presence of a sample rack in the external sample loading position. In some embodiments, each internal sample loading position further comprises a sensor that detects the presence of a sample rack in the internal sample loading position. In some embodiments, each track comprises a rack transport mechanism for automatically transporting the rack between the external sample loading position and the internal sample loading position. In some embodiments, the rack transport mechanism comprises a stepper motor. In some embodiments, the rack transport mechanism comprises an arm that contacts and transports the sample rack from the external loading position to the internal loading position. In some embodiments, the arm is configured to engage a tab asymmetrically positioned on an end of the rack. In some embodiments, the arm contacts and transports the sample rack from the internal loading position to the external loading position. In some embodiments, the sample loading system further comprises an indicator light to provide feedback to a user. In some embodiments, the indicator light indicates a state of the sample rack, the external sample loading position, the internal sample loading position, the sample loading system or a combination thereof. In some embodiments, the sample loading system is operably connected to an automated sample processing device. In some embodiments, the sample loading system allows for loading of a sample into the automated sample processing device without interruption of the automated sample processing device. In some embodiments, the automated sample processing device comprises an automated sample analysis system. In some embodiments, the sample loading system allows for loading of a sample into the automated sample analysis system while the automated sample analysis system is performing an assay of a previously loaded sample.

Aspects of the present disclosure include a method of automatically identifying a sample container loaded into an automated sample processing device, the method comprising: conveying a camera attached to a conveyor to an imaging position along a sample rack track; transporting a sample rack comprising a sample container from an external sample loading position to an internal sample loading position along the sample rack track; imaging the sample container within the sample rack using the camera to acquire a sample container image; transferring the sample container image to a computing device; processing the sample container image using the computing device to automatically identify the sample container.

In some embodiments, the processing comprises automatically identifying the type of the sample container. In some embodiments, the processing comprises automatically identifying the size of the sample container. In some embodiments, the processing comprises automatically identifying whether the sample container is capped or uncapped. In some embodiments, the processing comprises automatically detecting whether a removable part of the sample rack is present. In some embodiments, the method further comprises rejecting the sample rack when the removable part is not detected. In some embodiments, the removable part is a cap retention bar. In some embodiments, the method further comprises rejecting the sample rack when the identified sample container has a pierceable cap and the cap retention bar is not detected. In some embodiments, the sample rack comprises a plurality of sample containers, the imaging comprises imaging each sample container of the plurality within the rack to acquire a sample container image of each sample container, the transferring comprises transferring each sample container image to the computing device, and the processing comprises processing each sample container image to automatically identify each sample container of the plurality. In some embodiments, the sample container image of each sample container comprises a single image capture event. In some embodiments, the sample container image of each sample container comprises a plurality of image capture events. In some embodiments, the method further comprises: conveying a second sample rack along a second rack track to acquire an additional sample container image of a sample container present in the second rack; transferring the additional sample container image to the computing device; and processing the additional sample container image to automatically identify the sample container present in the second rack. In some embodiments, the method comprises scanning to detect one or more barcodes affixed to the sample container, the sample rack or a combination thereof. In some embodiments, the method further comprises rejecting the sample rack when the one or more barcodes are not detected. In some embodiments, the method further comprises obtaining data from one or more barcodes detected by the scanning. In some embodiments, the data comprises sample information, assay information, or both. In some embodiments, the method further comprises assessing whether the data obtained from the one or more barcodes matches the identified sample container. In some embodiments, the scanning is performed by the camera. In some embodiments, the automated sample processing device comprises an automated sample analysis system. In some embodiments, the method further comprises querying a user for which of a plurality of assays is to be performed using the identified sample container. In some embodiments, the sample rack comprises a plurality of sample containers and the method further comprises querying a user for which of a plurality of assays is to be performed on each identified sample container of the plurality. In some embodiments, the plurality of assays comprise infectious disease assays.

Aspects of the present disclosure include a method of automatically processing a sample in an automated sample processing device, the method comprising: automatically identifying a sample container loaded into the automated sample processing device; retrieving a volume of sample from the sample container using a computer controlled retrieval device, wherein the retrieving process is based on the identity of the sample container; and processing the volume of sample in the automated sample processing device.

In some embodiments, the method further comprises inserting the computer controlled retrieval device into the sample during the retrieving at a rate determined based on the identity of the sample container. In some embodiments, the retrieving comprises piercing a pierceable cap of the sample container when the sample container is identified as having a pierceable cap. In some embodiments, the piercing is performed by the computer controlled retrieval device. In some embodiments, the computer controlled retrieval device comprises an aspirator. In some embodiments, the retrieving comprises aspirating the volume of sample from the sample container. In some embodiments, the sample container is loaded without interruption of the automated sample processing device. In some embodiments, the automated sample processing device comprises an automated sample analysis system. In some embodiments, the sample container is loaded into the automated sample analysis system while the automated sample analysis system is performing an assay of a previously loaded sample. In some embodiments, the automated sample analysis system comprises a plurality of different infectious disease assays. In some embodiments, the processing comprises running an infectious disease assay on the volume of sample.

Aspects of the present disclosure include a sample loading system comprising: a pair of external and internal sample loading positions each dimensioned to receive a sample rack having a removable part; a track linking the external sample loading position to the internal sample loading position of the pair; a camera connected to a conveyor that conveys the camera to an imaging position adjacent to the track such that the camera generates an image of the sample rack; and a computing device, operably connected to the camera, comprising a non-transitory computer readable medium storing instructions that, when executed by the computing device, cause the computing device to detect from the image the presence or absence of the removable part.

In some embodiments, the removable part comprises cap retention bar. In some embodiments, the non-transitory computer readable medium comprises instructions that, when executed by the computing device, cause the computing device to compare the color, intensity or a combination thereof of a region of interest (ROI) of the image to a reference to detect the presence or absence of the removable part. In some embodiments, the ROI comprises all or a portion of the rack. In some embodiments, the ROI comprises all or a portion of the removable part. In some embodiments, the ROI comprises all or a portion of a container present in the rack. In some embodiments, the ROI comprises all or a portion of a cap present on the container.

Aspects of the present disclosure include a method of automatically detecting the presence or absence of a removable part of a sample rack, the method comprising: conveying a camera attached to a conveyor to an imaging position along a sample rack track; transporting a sample rack comprising a removable part from an external sample loading position to an internal sample loading position along the sample rack track; imaging the sample rack using the camera to acquire a sample rack image; transferring the sample rack image to a computing device; processing the sample rack image using the computing device to automatically detect the presence or absence of the removable part.

In some embodiments, the removable part comprises a cap retention bar. In some embodiments, the processing comprises comparing the color, intensity or a combination thereof of a region of interest (ROI) of the sample rack image to a reference to detect the presence or absence of the removable part. In some embodiments, the ROI comprises all or a portion of the sample rack. In some embodiments, the ROI comprises all or a portion of the removable part. In some embodiments, the ROI comprises all or a portion of a container present in the sample rack. In some embodiments, the ROI comprises all or a portion of a cap present on the container.

Aspects of the present disclosure include a method of automatically processing a sample in an automated sample processing device, the method comprising: automatically detecting the presence or absence of a removable part of a sample rack loaded into the automated sample processing device; rejecting the sample rack when the removable part is absent; and processing a volume of sample from a sample container present in the sample rack in the automated sample processing device when the removable part is present.

In some embodiments, the processing comprises retrieving the volume of sample from the sample container using a computer controlled retrieval device. In some embodiments, the removable part is a cap retention bar. In some embodiments, the method further comprises rejecting the sample rack when the sample container has a pierceable cap and the cap retention bar is absent. In some embodiments, the method further comprises processing a volume of sample from a sample container present in the sample rack when the sample container does not have a cap and the cap retention bar is absent.

BRIEF DESCRIPTION OF THE FIGURES

FIG. 14 depicts an embodiment of various status indicators as described herein.

DEFINITIONS

Figure 1:
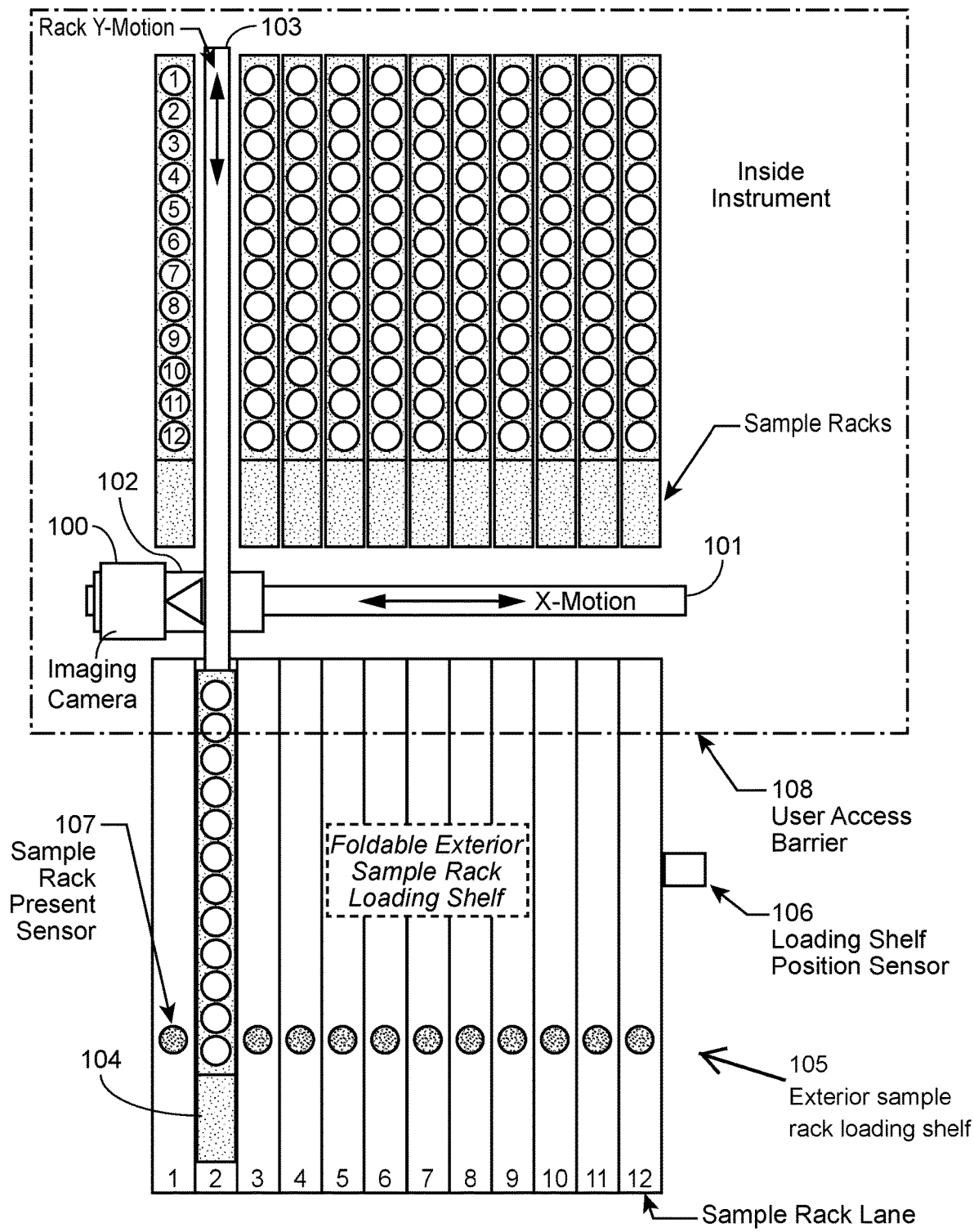
FIG. 1 provides a schematic overview of an automated sample loading system that includes external and internal sample loading areas, a plurality of sample rack tracks and various other elements.

The term "assessing" includes any form of measurement, and includes determining if an element is present or not. The terms "determining", "measuring", "evaluating", "assessing" and "assaying" are used interchangeably and include quantitative and qualitative determinations. Assessing may be relative or absolute. "Assessing the identity of" includes determining the most likely identity of a particular compound or formulation or substance, and/or determining whether a predicted compound or formulation or substance is present or absent. "Assessing the quality of" includes making a qualitative or quantitative assessment of quality e.g., through the comparisons of a determined value to a reference or standard of known quality.

The term "bodily fluid" as used herein generally refers to fluids derived from a "biological sample" which encompasses a variety of sample types obtained from an individual or a population of individuals and can be used in a diagnostic, monitoring or screening assay. The definition encompasses blood and other liquid samples of biological origin. The definition also includes samples that have been manipulated in any way after their procurement, such as by mixing or pooling of individual samples, treatment with reagents, solubilization, or enrichment for certain components, such as nucleated cells, non-nucleated cells, pathogens, etc.

The term "biological sample" encompasses a clinical sample, and also includes cells in culture, cell supernatants, cell lysates, serum, plasma, biological fluid, and tissue samples. The term "biological sample" includes urine, saliva, cerebrospinal fluid, interstitial fluid, ocular fluid, synovial fluid, blood fractions such as plasma and serum, and the like.

The terms "control", "control assay", "control sample" and the like, refer to a sample, test, or other portion of an experimental or diagnostic procedure or experimental design for which an expected result is known with high certainty, e.g., in order to indicate whether the results obtained from associated experimental samples are reliable, indicate to what degree of confidence associated experimental results indicate a true result, and/or to allow for the calibration of experimental results. For example, in some instances, a control may be a "negative control" assay such that an essential component of the assay is excluded such that an experimenter may have high certainty that the negative control assay will not produce a positive result. In some instances, a control may be "positive control" such that all components of a particular assay are characterized and known, when combined, to produce a particular result in the assay being performed such that an experimenter may have high certainty that the positive control assay will produce a positive result. Controls may also include "blank" samples, "standard" samples (e.g., "gold standard" samples), validated samples, etc.

The term "inputting", as used herein, is used to refer to any way of entering information into a computer, such as, e.g., through the use of a user interface. For example, in certain cases, inputting can involve selecting an assay to be run on a sample, where e.g., the assay parameters are already present on a computer system. In other cases, inputting can involve adding an assay or an assay parameter to a computer system, e.g., through a device capable of interfacing with a computer. Inputting can also be done using a user interface.

By "data processing unit", as used herein, is meant any hardware and/or software combination that will perform the functions required of it. For example, any data processing unit herein may be a programmable digital microprocessor such as available in the form of an electronic controller, mainframe, server or personal computer (desktop or portable). Where the data processing unit is programmable, suitable programming can be communicated from a remote location to the data processing unit, or previously saved in a computer program product (such as a portable or fixed computer readable storage medium, whether magnetic, optical or solid state device based).

As used herein, the term "executing" is used to refer to an action that a user takes to initiate a program.

DETAILED DESCRIPTION

Provided are methods for the automated loading and/or automatic processing of one or more samples in an automated sample processing device. Also provided are automated sample loading systems and devices that include automated sample loading systems or devices that are utilized in such systems.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

As summarized above, the present disclosure provides methods for the automated loading and/or automatic processing of one or more samples in an automated sample processing device. The subject methods may make use of and/or provide for the automated processing of samples. The subject methods may also make use of and/or provide for automated identification of sample tubes, sample racks and/or components thereof, including where such identification is utilized in a method for automated sample processing.

Automated Sample Processing

As summarized above, the present disclosure provides for and/or makes use of automated sample processing. Automated sample processing procedures may include intake of a sample into an automated sample processing device, retrieval of the sample or an aliquot (i.e., a volume) of the sample from a sample container, treatment of the sample or aliquot through one or more sample processing steps (e.g., isolation and/or extraction of a component (e.g., cell, nucleic acid, protein, etc.) of the biological sample, one or more chemical processes (e.g., lysis, degradation/digestion, replication/amplification, etc.) performed on the sample or aliquot or component thereof, analysis of the sample or aliquot or component or derivative (e.g., digest, amplification product, etc.) thereof. For simplicity, sample aliquots, sample components and sample derivatives will be collectively referred to herein using the term "sample" except where indicated otherwise or clearly inappropriate or irrelevant, as an ordinary skilled artisan would readily understand. One or more, including all, the processes of automated sample processing may be performed by one or more mechanical components controlled by a computing device.

In some embodiments, automated sample processing may include automated sample analysis. In some instances, a sample may be previously processed (e.g., by a separate automated sample processor or by hand) and the previously processed sample may then be introduced into an automated sample processing and analysis system as described herein. In some instances, a sample may not be previously processed prior to being introduced into an automated sample processing and analysis system. For example, a sample may be collected from a subject and the sample may be introduced into the automated sample processing and analysis system without intervening processing of the sample.

Subjects from which a sample may be acquired include but are not limited to human subjects, mammalian subjects (e.g., primates (apes, gorillas, simians, baboons, orangutans, etc.), ungulates (e.g., equines, bovines, camelids, swine, etc.), canines, felines, rodents (mice, rats, etc.), etc. Sample may include biological fluid samples and biological samples which may be processed prior to analysis, e.g., processed to extract and/or amplify nucleic acids.

In certain aspects, the sample is a cellular sample. The cellular sample may be a collection cells, e.g., from whole blood, serum, plasma, a tissue, organ, and/or the like of a mammal (e.g., a human, a rodent (e.g., a mouse), or any other mammal of interest). In other aspects, the cellular sample may be a collection cells from a source other than a mammal, such as bacteria, yeast, insects (e.g., drosophila), amphibians (e.g., frogs (e.g., *Xenopus*)), viruses, plants, or any other non-mammalian nucleic acid sample source.

In some embodiments, the subject methods may include automated analysis of a sample in one or more assays. For example, in some instances, a sample may be analyzed through a detection assay for the presence of an analyte, where such assays may or may not be quantitative. In some instances, the subject analysis may include infection disease assays. A single assay, e.g., a single infectious disease assay, may be performed on a subject sample or multiple different assays, e.g., multiple different infectious disease assays to detect multiple different disease analytes of the same or different diseases, may be performed on a single sample.

Non-limiting examples of infectious agents for which a subject assay may be performed include but are not limited to e.g., one or more of human immunodeficiency virus (HIV), Hepatitis C virus (HCV), Hepatitis B virus (HBV), *Chlamydia trachomatis* (CT), *Neisseria gonorrhoeae* (NG), Human papillomavirus (HPV), Cytomegalovirus (CMV), Epstein-Barr virus (EBV), Polyomavirus BK (BKV), Methicillin-resistant *Staphylococcus aureus* (MRSA), *Clostridium difficile* (C. Diff.), Vancomycin-resistant enterococci (VRE), adenovirus, *Mycobacterium tuberculosis* (TB), Varicella Zoster Virus (VZV), Herpes simplex virus (HSV), John Cunningham virus (JCV), enterovirus, Lymphogranuloma Venereum (LGV), viruses of a Respiratory Viral Panel (RVP), Human Herpesvirus 6 (HHV6), *Trichomonas vaginalis*, *Mycoplasma genitalium*, norovirus, and zika virus.

Where multiple different sample processing protocols and/or multiple different assays are available in such an automated method, the device or a component thereof may prompt or query a user for which of the multiple different sample processing protocols and/or multiple different assays are to be performed on the sample. Where multiple samples are loaded into an automated sample processing and/or analysis device, the device or a component thereof may prompt or query a user for which of the multiple different sample processing protocols and/or multiple different assays are to be performed on each of the loaded samples. Such queries may be coordinated with methods of sample container identification, e.g., as described herein, including e.g., where a user is queried for which processing protocol and/or assay is to be performed on a sample before, during or after the sample container is identified. For example, a sample tube may be identified as a certain type of sample tube (e.g., a blood collection tube) and the device may then query the user as to which protocol and/or assay is to be performed on the identified sample tube (e.g., which protocol and/or assay is to be performed on the blood collection tube). As another example, a user may be queried as to which protocol and/or assay is to be performed on a particular sample tube and then the type of sample tube may be identified and the system may assess whether the chosen protocol and/or assay is compatible with the identified type of sample tube. Such assessments may, in some instances, affect further processing of the sample tube.

According to certain embodiments of the present disclosure, the provided methods may provide for introducing a sample into an automated processing and/or analysis device without interrupting automated sample processing and/or analysis already in progress. For example, a sample or a multi-sample container, such as a sample rack, may be loaded into an automated processing and/or analysis device while the device is processing previously loaded samples without necessitating stopping or pausing the processing and/or analysis of the previously loaded sample(s).

The subject methods may include an automatically identifying the presence of a sample container or a multi-container device (e.g., a sample tube rack) that has been introduced into the sample processing and/or analysis device. Identifying the presence of an introduced sample container or multi-container device may, in some instances, trigger further processes, such as e.g., automatic loading of the sample container or multi-container device into the sample processing and/or analysis device, automatic identification of aspects of the detected sample container (e.g., type, size, the presence/absence of a removable component, etc.), and the like. In some instances, following introduction of a sample container or multi-container device into a sample processing and/or analysis device further action of the user may be required to trigger further processes, such as e.g., the user signaling to the device that a sample container and/or multi-container device has been introduced.

Automated loading of a sample container and/or multi-container rack into the device may be achieved through a variety of means. For example, the device may include an external sample loading area and an internal sample loading area and introduction of the sample container or multi-container rack into the external sample loading area may trigger, e.g., through the tripping or activation of a sensor, the sample container or rack to be transported by the device into the internal sample loading area.

In some embodiments, a device may include an external sample loading area and an internal sample loading area that are connected by a sample loading track. In some instances, the rack, when placed in a portion of the track in the external loading area, may activate a sensor that indicates the presence of the rack and triggers the transport of the rack from the external area to the internal area along the track. Any convenient method of transporting the rack between the external area to the internal area may be employed, including but not limited to e.g., a conveyor belt or controllable rollers, a component (e.g., an arm) that pushes, pulls, lifts, grabs, hooks or otherwise contacts the rack, and the like. The transporting may make use of any convenient and suitable electromechanical mechanism. In some embodiments, the device may employ an arm that hooks a tab or notch present on the rack to push and/or pull the rack between the internal and external areas.

Transporting the rack between the internal and external areas (i.e., from the external area to the internal area or from the internal area to the external area) may be continuous or discontinuous. In continuously transporting, the rack is moved from one position to the other (e.g., from the external loading position to the internal loading position or from the internal loading position to the external loading position) in one motion without stopping or pausing. In discontinuously transporting, the rack is moved from one position to the other (e.g., from the external loading position to the internal loading position or from the internal loading position to the external loading position) with at least one stop or pause. In some instances, the rack may pause once or the rack may pause once for each container position on the rack or each container present in the rack, e.g., to allow for stationary imaging of the rack, the container positions of the rack and/or containers present in the rack, e.g., as described in more detail below.

Methods of the present disclosure include multiplex automated sample processing and/or analysis methods, including e.g., where each subject rack holds a plurality of sample containers and/or each automated sample processing and/or analysis device is configured with a plurality of external/internal sample loading position pairs and subsequently a plurality of tracks joining each external/internal sample loading position pair. For example, the subject methods may include transporting a second sample rack between external and internal loading positions along a second sample rack track before, during or after the transport of a first sample rack.

When a sample container is present in an internal sample loading position, a volume of sample (i.e., an aliquot) may be retrieved from the sample container. Such methods of retrieving a volume of sample from a sample container may vary and will include essentially any mode of transporting a liquid sample or a portion thereof, such as e.g., pipetting, aspirating, etc. In some embodiments, the method of retrieval will be dependent on one or more detected attributes of the sample container, including e.g., the type of container, the shape of the container, the size of the container, the presence/absence of a component of the container, etc., as described in more detail below.

One or more detected attributes of the sample container may influence various aspects of the sample retrieval method employed. For example, the type, size or shape of a sample container may influence the depth to which a sample retrieval mechanism is inserted into the sample container. The type, size or shape of a sample container may influence the speed at which a sample retrieval mechanism is inserted into the sample container. In some instances, attributes of the sample container identified according to a method as described herein may influence the procedure utilized to retrieve fluid from the container. For example, in some instances, attributes of the sample container, including e.g., the type of container, the shape of the container (e.g., whether the container has a round, flat or conical bottom, etc.) the diameter of the container, etc., may influence movements of the sample retrieval device while the sample is being retrieved from the container.

In some embodiments, a sample retrieval device having a fluid sensor may be inserted into a container for which one or more particular container attributes (e.g., shape, size, diameter, etc.) have been detected. Upon detection of fluid by the fluid sensor insertion of the sample retrieval device may be stopped or may be continued for some distance (e.g., 1 mm to 10 mm, including e.g., 1 mm to 5 mm, 1 mm to 3 mm, 2 mm to 3 mm., etc.) and then stopped or paused before sample retrieval (e.g., aspiration) is begun. In some instances, maintaining only a small amount of insertion of the tip of a sample retrieval device into the fluid may prevent accumulation of fluid on outside surfaces of the sample retrieval device, which may in turn prevent dripping of fluid from outside surfaces of the sample retrieval device.

During sample retrieval, the sample retrieval device may be continually lowered into the fluid at a rate that is based on one or more of the detected container attributes such that the relationship between the sample retrieval device and the fluid level is maintained despite a decreasing fluid level due to fluid extraction from the container. For example, the rate that the sample retrieval device is continually lowered into the container may be based on the determined diameter of the container, where e.g., a container having a smaller diameter will have a more rapid drop in fluid level as compared to a similar container having a larger diameter. As such, in this example, where a larger container diameter is detected a slower rate of lowering of the sample retrieval device may be employed as compared to where a smaller container diameter is detected and vice versa. In some instances, a subject system may employ a calculation based on attributes of the container to determine the rate at which the fluid level will fall during fluid extraction. Such a calculation may be based on various parameters including e.g., the rate of fluid extraction, the diameter of the container, the overall size and shape of the container, and the like.

The presence/absence of a component of a sample container, e.g., whether a sample container has a cap and/or whether the cap is a pierceable cap, may also influence the method employed to retrieve sample from the container. For example, where a pierceable cap is detected, the method may include a movement by a sample retrieval device (or other component of the system) sufficient to pierce the pierceable cap allowing access to the sample. In some instances, one or more detected attributes of the sample container may cause a mechanism not to perform a particular step or movement. For example, where a non-pierceable cap is detected or the absence of a cap is detected the device may not attempt a particular step or movement, e.g., a movement configured for piercing a pierceable cap. In some instances, insertion of a sample retrieval device into a sample tube may be the same whether or not the presence of a cap is detected on the tube.

Sample retrieval devices of the present methods will generally be computer controlled, allowing for automated sample retrieval from a subject container. A computer controller connected to a sample retrieval device may control various aspects of the retrieval device including but not limited to e.g., the position of the sample retrieval device relative to the sample container, the depth to which the sample retrieval device is inserted into the container, the volume of sample retrieved from the sample container, and the like. In some instances, an employed sample retrieval device may include a fluid detection component for detecting contact of the sample retrieval device with fluid. Such devices may be employed for various purposes including e.g., determining the depth to which the sample retrieval device should be inserted into the container, determining the level of fluid present in the sample container, and the like. In some instances, a level of fluid in a container determined using fluid detection component of a sample retrieval device may be employed in conjunction with information about the sample tube type, e.g., as obtained according to the methods described herein, to calculate or determine the volume of fluid present in the sample tube. Any convenient fluid detection component employing any convenient method of fluid detection, including e.g., electrical sensors (e.g., based on change in electrical current, capacitance, impedance, etc.), may be employed. In some instances, aspects of the retrieval device and movements thereof may be influenced by the identified type of sample container or other attributes of the sample container, including e.g., those identified according to methods described herein.

Systems of the present disclosure may be capable of determining the volume of fluid present in a container. As such, the present methods may include determining whether a sufficient volume of fluid is present in the container to aspirate a desired or required amount for downstream processing steps. Calculating the volume of fluid present in a container may include one or more aspects of the container determined according to the methods described herein. For example, one or more aspects of the container (e.g., the type of container, the diameter of the container, the shape of all or a portion of the container, combinations thereof, etc.) may be determined using an imaging based method and the determined aspect of the container may be combined with other information, e.g., the fluid level within the container, to determine the volume of fluid present in the container. In some instances, the volume of fluid present in the container may be based, at least in part, on the identified type of container. In some instances, the volume of fluid present in the container may be based, at least in part, on the diameter of the container. In some instances, the volume of fluid present in the container may be based, at least in part, on the shape of all or a portion of the container (e.g., the shape of the bottom of the container, including round, flat, conical, etc.). In some embodiments, the fluid level in the container may be determined based on a fluid detection component of the sample retrieval device and the determined fluid level may be combined with one or more identified aspects of the container to produce a calculated fluid volume. In some instances, a calculated fluid volume may be compared to a reference value for various purposes. For example, a calculated fluid volume may be compared to a reference fluid volume representing the amount of fluid required for a particular process or assay. In some instances, when the amount of fluid required is more than the calculated fluid volume present in the container the process may be stopped and/or an error message may be generated, e.g., indicated that insufficient sample volume is present. Various other uses of the calculated fluid volume may be employed in the subject methods.

The present methods may include one or more processing steps, where processing steps may include preparing a sample, generating a product from the sample and/or analyzing the sample or the product, including analyzing to detect an analyte. In certain aspects, such processing steps may include processing steps of preparing a nucleic acid sample. Accordingly, the methods may, but need not necessarily, include one or more steps involved in lysing a cellular sample to produce a lysed sample, washing nucleic acids present in a lysed sample, transferring nucleic acids from a lysed sample in the lysis well successively to two or more wash wells, transferring washed nucleic acid from a final wash well to an elution well, eluting the nucleic acids and transferring the eluted nucleic acids to a reaction vessel, and the like. Examples of sample processing steps and devices/reagents that may be employed in such steps include but are not limited to e.g., those described in PCT Application Nos.: US2017/022597, US2017/022601 and US2017/022504; the disclosures of which are incorporated herein by reference in their entirety.

Automatically Identifying Sample Containers, Racks and Components Thereof

As summarized above, methods of the present disclosure may include automatically identifying sample containers, automatically identifying multi-sample container holders (e.g., racks) and/or components thereof. Sample containers useful in the instant methods will vary and may include commercially available as well as custom manufactured containers, including but not limited to e.g., tubes, vials, cups and the like.

Useful sample tubes include but are not limited to e.g., microcentrifuge tubes, blood collection tubes, culture tubes, centrifuge tubes, conical tubes, round-bottom tubes, and the like. Sample tubes may include any essentially cylindrical tube configured to be placed inside a tube holder (i.e., a tube rack). Sample tubes may vary and may be either specifically designed to be compatible with a particular sample rack or may be any conventional laboratory tube that is compatible with a sample rack. For example, conventional laboratory tubes, include, but are not limited to, 0.5 mL microcentrifuge tubes, 1.5 mL microcentrifuge tubes, 2.0 mL microcentrifuge tubes, 5 mL tubes, 13 mL tubes, 15 mL tubes, 50 mL tubes, and the like. Such conventional laboratory or industrial centrifuge tubes include those that are commercially available, e.g., from Eppendorf (Hamburg, Germany), BD Biosciences (San Jose, Calif.), Thermo Fisher Scientific (Rockford, Ill.), and the like.

In some instances, a sample tube may be a tube configured for the collection of a bodily fluid, such as e.g., a "blood collection tube". Although referred to as blood collection tubes, such tubes may be commonly repurposed for the collection of other biological samples including but not limited to e.g., whole blood, serum, plasma, urine, cerebrospinal fluid (CSF), amniotic fluid, saliva, synovial fluid, pleural fluid, pericardial fluid, peritoneal fluid and the like. Sample tubes may or may not contain negative pressure, i.e., may or may not be what is commonly referred to as a vacuum tube (e.g., BD Vacutainer®, Becton, Dickinson and Company, Franklin Lakes, N.J.).

In some instances, blood collection tubes with color coded caps may be employed in the subject methods, where e.g., the color coding of the cap may be indicative of the type of tube, the type of sample, one or more additives present in the tube, and/or the like. For example, a blood tube with a red cap may indicate a serum sample with or without additional additives. A blood tube with a red/black cap may indicate a serum sample and/or the presence of a silica clot activator. A blood tube with a gray/yellow cap may indicate a serum sample and/or the presence of thrombin. A blood tube with a green cap may indicate a plasma sample and/or the presence of heparin (e.g., lithium heparin or sodium heparin). A blood tube with a lavender cap may indicate a plasma sample and/or the presence of EDTA. A blood tube with a tan or brown cap may indicate a plasma sample and/or the presence of EDTA. A blood tube with a gray cap may indicate a plasma sample and/or the presence of sodium fluoride/potassium oxalate.

A wide variety of sample containers may be employed in the subject methods, including e.g., where various different sample tubes are present in multiple racks and/or various different sample tubes are present in a single multi-tube rack. The present methods facilitate the identification of each type of sample container present and/or parameters of the subject contains such as size, shape, etc. The detected identification and/or parameters of the subject contains may be employed in automated methods, including the automated extraction or retrieval of sample from the subject containers.

In some embodiments, sample container identification and/or sample container parameter detection involves obtaining an image of the sample container and processing the image to identify the sample container and/or detect one or more parameters of the container. Such images may be obtained in a variety of ways but will generally include conveying the sample container past a camera which captures the image. The camera may be positioned adjacent to a track along which the sample container is transported, including e.g., a track joining an internal and an external loading position of a rack containing the sample container. The position at which the camera captures an image of the sample container may be referred to herein as an "imaging position". Such imaging positions may be adjacent to the path of the sample container along a track and sufficiently close to the sample container to capture an image of the sample container as it passes.

A digital camera may be employed to image the sample container to acquire a digital image of the sample container. For example, where the sample container is a sample tube, a camera may be employed to generate a sample tube image. The sample container image may be acquired when the sample container is present in a rack holding the sample container. For example, as described in more detail below, in some instances a sample rack may be employed that has an opening, such as but not limited to a gap or slit in the wall of the rack, through which an image of the sample container may be acquired. In some embodiments, an optically clear rack may be employed, e.g., where the rack is not configured with an opening through which the container can be imaged.

Images generated by a camera of the instant methods may vary. For example, the image generated may include only a single sample container present in a rack and thus only a portion of the rack may be included in the image or the image may exclude the rack entirely. In some instances, two or more sample containers may be included in a single image, including but not limited to e.g., 3 or more, 4 or more, 5 or more, 6 or more, 7 or more, 8 or more, 9 or more, 10 or more, 11 or more, 12 or more, etc., including all of the sample containers present in a rack. In some instances, a captured image may include or exclude the entire rack, more than about 75% of the rack, more than half of the rack, about half of the rack, less than half of the rack, less than about 25% of the rack, etc. Accordingly, where a plurality of sample containers are present in a rack, a captured image may include the entire plurality or a portion thereof and, as such, a single image capture event may be performed or multiple images may be captured (i.e., multiple image capture events may be performed).

In some embodiments, the image generated may include the entirety of one or more sample containers or only a portion of one or more sample containers. In some instances, a captured image may include or exclude the entire container, more than about 75% of the container, more than half of the container, about half of the container, less than half of the container, less than about 25% of the container, etc. In general, where the captured image is employed to identify the type of container, the amount of the container captured in the image will be sufficient for such identification.

The camera employed in the subject methods to capture images of sample containers and/or one or more racks holding such sample containers may be moveable. For example, the subject camera may be linearly moveable to two or more different imaging positions, including e.g., where each imaging position is adjacent to a track along which a sample rack travels during transport. In some instances, the path of travel of the camera may be orthogonal to the track along which a sample rack is transported. In some embodiments, the physical relationship between the camera and the sample rack (or associated track) may be the same for each imaging position. For example, at each imaging position, the camera and the sample rack (or track associated with the imaging position) may be essentially the same distance apart, may be at essentially the same orientation (i.e., imaging angle), etc.

For example, turning to the embodiment schematized in FIG. 1, a sample loading system is depicted from above where the imaging camera (100) is conveyed along an imaging camera track (101) to various imaging positions via a conveyor (102). In FIG. 1, the imaging camera is depicted in an imaging position associated with the track (103) along which the second sample rack (104) is transported. In some instances, the track along which a sample rack travels may be referred to as a "sample rack lane". As depicted, the relative movements of the camera and the sample racks may be defined as "X-motion" and "Y-motion", respectively. The depicted embodiment includes sample racks having 12 slots for sample containers and a system having 12 sample rack tracks; however, one or ordinary skill will readily recognize that these elements may be increased or decreased as desired depending on the overall configuration of the device.

The embodiment depicted further includes an exterior sample rack loading shelf (105) that is foldable between an open loading position and a closed loading position (detectable by a loading shelf position sensor (106)) and also includes a sample rack presence sensor (107) in each lane. As the racks are transported from the exterior loading shelf to the inside of the instrument or from the inside of the instrument to the exterior loading shelf the racks may pass through a user access barrier (108) which prevents user access to the inside of the instrument. An ordinary skilled artisan will recognize that certain elements of the depicted embodiment may be present or absent in particular configurations.

Acquired digital images may be captured using any suitable image capturing device. At a minimum a suitable image capturing device, for use in the described methods, will include a digital camera capable of capturing a digital image and a means of storing the digital image and/or transferring the image to attached image processing circuitry or to an attached storage device for later transfer to image processing circuitry. Suitable digital cameras will vary and will generally include any digital camera with sufficiently high resolution and sufficient color capture to capture an image that may be processed according to the methods described herein.

Following capture of digital images of the subject methods, the images may be transferred to a computing device. Transferred images may be processed immediately following acquisition or may be stored for some length of time on a suitable device or medium prior to processing. Digital images may be transferred by a data or computer connection or may be received on a computer readable medium.

A "digital image", as used herein, generally refers to a numeric representation (e.g., binary representation) of a two-dimensional image that may be of fixed or unfixed resolution. Fixed resolution images have a fixed number of rows and columns of pixels in an XY orientation. In some instances, digital images may be three-dimensional having fixed number of voxels in a XYZ orientation. Pixels and voxels are stored in computer memory as a raster image or raster map, a two-dimensional or three-dimensional array of small integers transmitted or stored in an uncompressed or compressed form. Suitable digital image file formats include but are not limited to e.g., BMP, BPG, CD5, DEEP, ECW, Exif, FITS, FLIF, GIF, HDR, HEIF, ILBM, ILBM, IMG, IMG, JPEG 2000, JPEG XR, JPEG/JFIF, Layered Image File Format, Nrrd, PAM, PBM, PCX, PGF, PGM, PLBM, PNG, PNM, PPM, SGI, SID, Sun Raster, TGA, TIFF, VICAR, WEBP, and the like.

Digital images may be a variety of image bit depths depending, e.g., on the particular type of image captured (e.g., color or grayscale) and the sensitivity or the digital camera or other image capture device and may include but are not limited to e.g., 8-bit, 10-bit, 12-bit, 14-bit, 16-bit, 18-bit, 24-bit, 30-bit, 36-bit, 48-bit, 64-bit, and the like. In some instances, the channels of a color image may individually be or may be split into individual 8-bit grayscale images. In some instances, the channels of a color image may individually be or may be split into individual 16-bit grayscale images.

As summarized above, the present methods may include processing an image of a sample container to identify and/or detect certain attributes of the sample container and/or certain attributes of the sample rack. Non-limiting examples of sample tube attributes that may be identified according to the described methods include the sample container type (e.g., sample tube type), the shape of the sample container (e.g., conical, round bottom, flat bottom, etc.), dimensions of the sample container (e.g., diameter (e.g., maximal diameter, minimal diameter, etc.), length, volume, etc.), whether the sample container is capped, the type of cap if present (e.g., whether the cap is pierceable, whether the cap is not pierceable, etc.). Such processing may involve computer-aided identification of image features and extracting image feature related data from identified image features. Non-limiting examples of sample rack attributes that may be identified according to the described methods include whether a removable portion of the rack is or is not present or properly positioned, etc.

The image processing functions utilized in the subject methods will vary. In some instances, a captured image may be segmented through image segmentation processes. As used herein, the terms "segmented" and "segmentation" as they relate to image processing generally refer to the division or partitioning of an image into meaningful structures or segments. Various methods for image segmentation may find use in the methods described herein or in preparation of an image for processing according to the methods as described herein. Selection of a particular segmentation method or combination of segmentation methods will depend on various factors including the type of image captured, the nature of subject matter of the image, the desired result of the image processing, the sample container attributes to be extracted, etc.

Image segmentation may be utilized to generate one or more regions of interest (ROI) and, in some instances, an image mask may be generated based on the segmented ROI such that further image processing steps are limited only to those pixels contained within the mask defined by the segmented ROI. Various masks may be generated depending on the particular processes to be performed. For example, a ROI may be generated for the sample rack or a portion thereof (i.e., a sample rack ROI). A ROI may be generated for the sample container or a portion thereof (i.e., a sample container ROI, a sample tube ROI, etc.). A ROI may be generated for the sample container cap or a portion thereof (i.e., a sample container cap ROI, a sample tube cap ROI, etc.). Where a plurality of sample containers or components thereof (e.g., sample container caps) are present an ROI may be generated for each of the plurality and each ROI may be processed separately, e.g., to identify or obtain attributes for each tube present in a sample rack. Where multiple ROIs are employed in a subject method, the multiple ROIs may be obtained from a single image or from across multiple images or multiple ROIs may be obtained from each of a plurality of images.

Whether one or more ROIs are employed in the subject image processing or whether the entire image is processed, the subject methods may include extracting a value from the image or a value over an obtained ROI. Non-limiting examples of values that may be extracted include color values, intensity (e.g., brightness, shading, etc.) values, shape values (e.g., circularity, aspect ratio, slope, angle, etc.), size values (e.g., length, width, diameter, etc.), and combinations thereof.

Extracted and/or calculated values of the subject methods may also include where two or more values or aspects of an image are compared. Compared values may be referred to, in some instances, as changes in a particular value. For example, two ROIs may be compared to determine a change (e.g., a change in color, a change in intensity, etc.) between the two ROIs. In some embodiments, a change in color or intensity of a ROI (e.g., a ROI corresponding to a sample container or a sample container cap) may be representative of the presence or absence of a removable component, e.g., a removable component of the sample rack such as a cap retention bar owing to the shadowing produced on the ROI by the cap retention bar. In some instances, a value extracted from an image or an ROI may be compared to a reference value (e.g., a reference value stored on computer memory). For example, in some instances, a computer memory attached to a device or system may include a library of reference values to which measured values may be compared. Comparison of measured values to one or more known reference values (e.g., of a reference value library) may, in some instances, facilitate the identification of sample containers, including sample container types, or attributes thereof.

Processing of images using a computing device may produce various results including but not limited to e.g., automatically identifying the sample tube, automatically identifying each sample container of a plurality of sample containers, automatically identifying the size of a sample container, automatically identifying whether the sample container is capped or uncapped, automatically identifying whether a removable part of a sample container is present, automatically identifying whether a removable part of a sample rack is present, and the like.

In some embodiments, the subject methods may also include the detection of one or more machine-readable mediums or machine-readable medium codes. Non-limiting examples of machine-readable media include but are not limited to e.g., magnetic media such as magnetic disks, cards, tapes and drums, punched cards and paper tapes, optical disks, barcodes, magnetic ink characters, and the like. In some instances, useful machine-readable codes may include e.g., barcodes including but not limited to e.g., 1 dimensional (1D) barcodes, 2 dimensional (2D) barcodes, and the like. In some instances, a unique machine-readable medium (e.g., a barcode) specific for particular sample or a subject from which a particular sample is derived may be attached to a sample container before, during or after a sample obtained from the subject is applied to the container such that the unique machine-readable medium is permanently associated with the sample. In some instances, a machine-readable medium (e.g., a barcode) may be adhered to a component (e.g., a sample rack or a removable part thereof) of the method to facilitate identification and/or detection of the component. Depending on the particular configuration, barcodes or other machine-readable mediums may be adhered to or excluded from any component of the subject methods, devices and systems described herein.

Where one or more machine-readable mediums are employed in the subject methods, an appropriate reader of the utilized machine-readable medium(s) may be utilized. For example, where one or more barcodes are employed the present methods may utilize one or more barcode readers. Useful barcode readers include but are not limited to e.g., laser barcode readers and 2D barcode readers. Non-limiting example of useful barcode readers include those available from commercial retailers such as e.g., Microscan Systems, Inc. (Renton, Wash.). In some instances, the camera utilized for capturing images of the sample rack and/or sample container employed in the subject method may also serve as a barcode reader. In some instances, the subject method may make use of a barcode reader separate from the camera utilized for capturing images of the sample rack and/or sample container.

Scanning of a barcode may provide for various functions within the described methods including but not limited to e.g., to obtain data (e.g., patient data, sample data, tracking data, assay data, sample priority data, etc.) from a barcode affixed to the sample container, to obtain data (e.g., rack type data, etc.) from a barcode affixed to the sample rack, and the like. In some instances, a barcode may provide information about the sample such as the sample type and/or what assay(s) are to be performed on the sample.

In some instances, where such information is provided, the subject method may include assessing whether data obtained from one or more barcodes is consistent with (i.e., matches) information extracted from an image of the sample container and/or sample rack obtained in the method. For example, where a barcode identifies a sample as a blood sample the method may assess whether the identified tube is a blood collection tube.

The subject methods may include one or more automated actions that are triggered by a result of an assessment made by the system. For example, where an assessment is made by the device comparing, e.g., the type of sample tube identified from an image of the sample tube to the type of sample tube as retrieved from a barcode or as indicated by input user, the device may perform an action accepting/rejecting the sample based on whether the comparison does or does not result in a match. Such actions may include but need not necessarily require a comparison. In some instances, the method may include an action rejecting a sample rack where a removable part of the sample rack is not detected (e.g., where a cap retention bar is not detected). Essentially any information obtained from the methods described herein (e.g., information obtained from an image of the sample container, information obtained from a machine-readable medium, information obtained from a comparison, etc.) may be fed back into the subject methods to trigger one or more additional method steps and/or actions of the device.

Such triggered actions include where processing of a sample is allowed to proceed (i.e., the processing determines whether the sample or sample container or sample rack "passes" a predetermined "checkpoint" prior to further processing). Such "check points" include but are not limited to e.g., if the sample is present, if the sample container is present, if a removable part of the sample rack is present (if necessary), if a removable part of the sample container (e.g., a sample container cap) is present (if necessary), if a removable part of the sample container (e.g., a sample container cap) is absent (if required to be absent), etc.

The above described methods may make use of, include or exclude any of the devices, systems and/or components thereof described below.

Devices and Systems

As summarized above, the present disclosure provides automated sample loading systems and devices that include or are utilized in such systems and/or the methods described above. By "automated sample loading systems" is meant systems that utilize electromechanical means to receive a sample from a user, e.g., placed in a sample rack, and input the sample into the system for further processing without the need for further action by the user. Included in the present disclosure are automated sample identification devices and/or subsystems. By "automated sample identification devices and/or subsystems" is meant systems that utilize electromechanical means to identify a sample and/or sample container after input of the sample container into the system without further action by a user. Such automated sample loading systems and automated sample identification devices and/or subsystems may be utilized in automated sample processing devices and systems, including those capable of automated sample analysis or having automated sample analysis devices and/or systems.

In some embodiments, automated sample processing devices of the present disclosure may be configured for multiplex sample processing and/or analysis and may include one or more devices for sample transport and/or sample processing including but not limited to e.g., automated sample retrieval devices (e.g., a computer controlled aspirator, a computer controlled pipettor, a computer controlled multi-channel aspirator, a computer controlled multi-channel pipettor, etc.), one or more components for sample lysis, one or more components for sample washing, one or more components for nucleic acid extraction, one or more components for nucleic acid elution, and the like. Examples of device and system components include but are not limited to e.g., those described in PCT Application Nos.: US2017/

022597, US2017/022601, US2017/022603, US2017/022502, US2017/022588 and US2017/022504; the disclosures of which are incorporated herein by reference in their entirety.

In some embodiments, the automated sample processing systems described herein facilitate the loading of one or more samples, e.g., within a sample loading rack, without interruption of ongoing automated sample processing. For example, a sample rack containing one or more samples may be placed by a user in a sample loading area and the sample may be automatically loaded into the device without interrupting ongoing processing of previously loaded samples within the device.

In some embodiments, the automated sample processing systems described herein facilitate the loading of one or more samples, e.g., within a sample loading rack, without interruption of ongoing automated sample analysis. For example, a sample rack containing one or more samples may be placed by a user in a sample loading area and the sample may be automatically loaded into the device without interrupting ongoing analysis of previously loaded samples within the device.

External Sample Loading

The devices and systems of the present disclosure may include an external sample loading area for external sample loading. The term "external sample loading area" as used herein generally refers to an area, external to the automated sample processing device, where a sample container or sample rack containing one or more sample containers may be placed by a user for automated loading by the device. Accordingly, a sample loading area will generally be accessible both by the user and at least one mechanical component of the device such that control of a sample container or sample rack placed in the area will be transferred from the user to the device. Actual configurations of external sample loading areas may vary and may include e.g., a platform, a shelf, a table, etc.

An external sample loading area may be dimensioned to receive a sample rack or may be dimensioned to receive a plurality of sample racks. For example, the number of sample racks an external sample loading area may be configured to receive may vary and may range from one to 50 or more, including but not limited to e.g., 1 to 40, 1 to 30, 1 to 20, 1 to 15, 1 to 12, 1 to 10, 1 to 5, 2 to 40, 2 to 30, 2 to 20, 2 to 15, 2 to 12, 2 to 10, 2 to 5, 5 to 40, 5 to 30, 5 to 20, 5 to 15, 5 to 12, 5 to 10, etc. Depending on the number of sample containers that may be held by each individual sample rack and the maximal number of racks in an external sample loading area, in some instances, the number of samples that can be introduced into an external sample loading area at one time may be 10 or more, including but not limited to e.g., 20 or more, 30 or more, 40 or more, 50 or more, 60 or more, 70 or more, 80 or more, 90 or more, 100 or more, 110 or more, 120 or more, 130 or more, 140 or more, 150 or more, 160 or more, 170 or more, 180 or more, 190 or more, 200 or more, etc.

An external sample loading area may include one or more sample rack lanes that may or may not include walls along the sides of the lanes and/or dividers between the lanes, e.g., to facilitate alignment of a sample rack within a lane. Where present, such lane dividers may vary in size, shape and dimensions. In some instances, the divider lanes may extend the entire length of the sample rack lane. In some instances, the divider lanes may extend less than the entire length of the sample rack lane, including e.g., more than half the length of the sample rack lane, less than half the length of the sample rack lane, and the like. In some instances, the divider lanes may extend the entire height of the sample rack. In some instances, the divider lanes may extend less than the entire height of the sample rack, including e.g., more than half the height of the sample rack, less than half the height of the sample rack, and the like.

Figure 2:
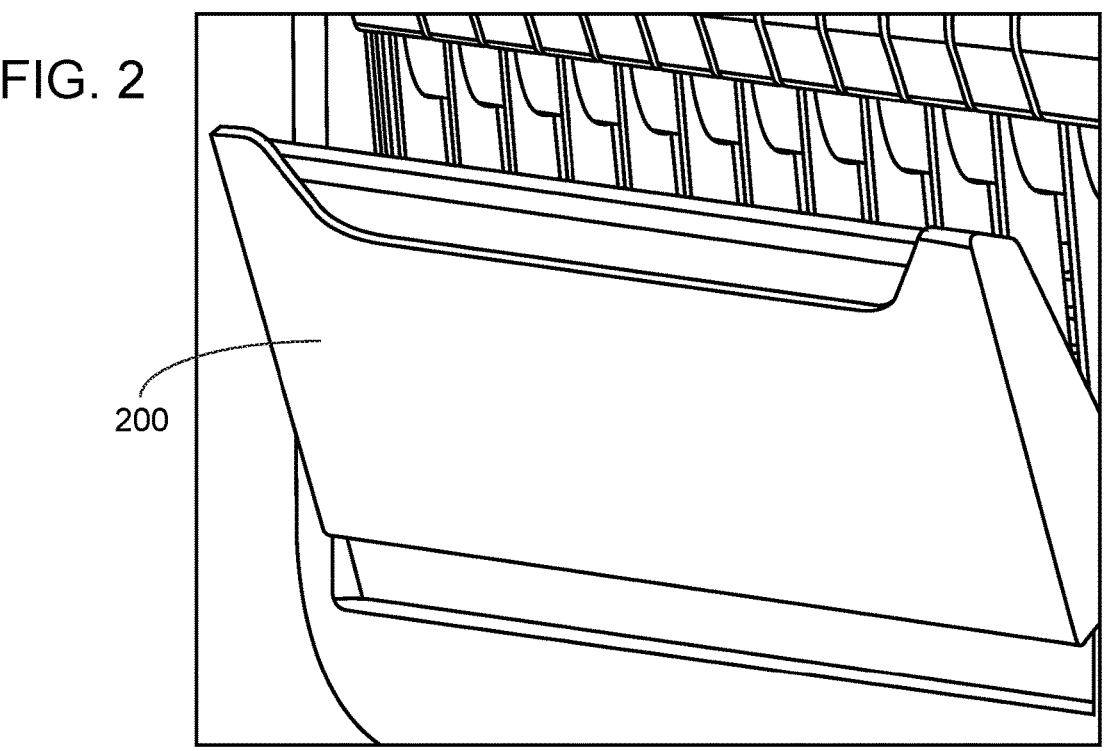
FIG. 2 depicts a sample loading shelf in a semi-closed configuration.
Figure 3:
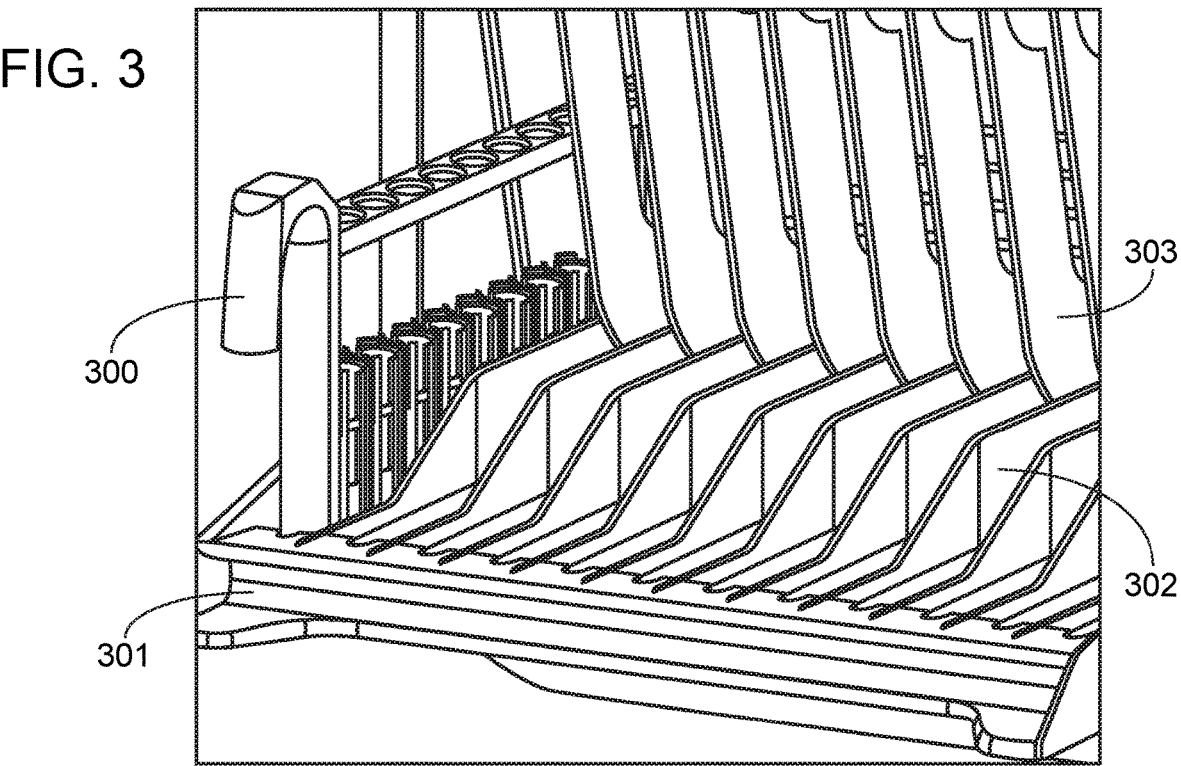
FIG. 3 depicts a sample loading shelf in an open configuration with a sample rack present in an external sample loading position.

An external loading area may be present on a loading shelf, where such a shelf may be in a fixed position or may be moveable. For example, in some instances, a system or device of the present disclosure may include a loading shelf that may be capable of pivoting between an open loading position (i.e., a position capable of receiving sample racks) and a closed loading position (i.e., a position where loading of sample racks is impossible, impractical or otherwise hindered). For example, an embodiment of a sample loading shelf (200) that that pivots between a closed loading position and an open loading position is depicted in a semi-closed configuration in FIG. 2 and an open configuration (with a sample rack (300) present) in FIG. 3). In some instances, where present, the loading self or a component of the system that interfaces with the loading shelf may include a sensor that senses whether the loading shelf is in a closed or open configuration.

External sample loading areas of the present disclosure may include a portion of a track along which a sample rack is transported into and/or out of an automated sample processing device, also referred to herein as a "sample rack track". The amount of the sample rack track that is present in the external sample loading area may vary and may include e.g., more than 75% of the sample rack track, less than 75% of the sample rack track, more than half of the sample rack track, about half of the sample rack track, less than half of the sample rack track, more than 25% of the sample rack track, less than 25% of the sample rack track, and the like. The remaining portion, i.e., the portion of the sample rack track not within the external sample loading area, may be present within an internal sample loading area, as described in more detail below.

In some embodiments, one or more, including all, of the sample loading positions (i.e., the position in which a sample rack is placed by a user) of an external sample loading area may include a sensor that detects the presence of a sample rack in the external sample loading position. For example, where a plurality of sample loading positions are present in a subject external sample loading area each sample loading position may include a sensor that detects the presence of a sample rack in the external sample loading position. Any convenient sensor may be employed including but not limited to e.g., a physical sensor (e.g., limit switch), a photoelectric or other optical sensor, an inductive sensor, an ultrasonic sensor, a capacitive sensor, a pressure sensor, and RFID-based sensor, etc. Accordingly, depending on the type of sensor employed, a sample rack may, in some instances, include a necessary detected element of the sensor (e.g., a magnet, a RFID tag, etc.).

The subject systems and devices may include a user access barrier. As used herein the term "user access barrier" generally refers to an assemblance of components that physically prevents a user from accessing (i.e., reaching into) an internal portion of the system or device. While in place, user access barriers may allow for the passage of sample containers and/or sample racks into the device, e.g., along a sample rack track but the passage may be dimensioned to be smaller than an average user's hand thus preventing user access through the same passage. A user access barrier and/or components thereof may be present entirely in an external loading area, entirely in an internal loading area, partially in an external loading area, partially in an internal loading area or in both an external loading area and an internal loading area. For example, in some instances, one component of a user access barrier may be present in an external loading area and a corresponding component of the user access barrier may be present in an internal loading area.

In some embodiments, a user access barrier may make use of a comb structure through which each sample container and/or sample rack passes during transport between the external loading position and the internal loading position. In such a configuration, the individual teeth or fins of a comb configured user access barrier may be placed sufficiently close together to prevent the hand of a user from passing between the teeth or fins while being sufficiently spaced apart to allow the sample container and/or sample rack to freely pass through. In some instances, a user access barrier may make use of one or more lane dividers that separate the individual lanes that correspond to sample rack tracks.

In some instances, both a comb structure and lane dividers may work in concert to form a user access barrier. For example, lane dividers present in the external sample loading area may be configured to align with the individual teeth or fins of a comb structure user access barrier attached to an internal potion of the device such that together the two components prevent user access to the inside of the device. As one non-limiting example, in the embodiment depicted in FIG. 3, a sample loading shelf (301) is shown in the open position where lane dividers (302) can be seen aligned adjacent to the combs (303) of a user access barrier.

Internal Sample Loading

As summarized above, the subject devices and systems may make use of an internal sample loading area for internal sample loading. The term "internal sample loading area" generally refers to an area within a subject device or system where sample containers and/or sample racks are transported for automated sample extraction or retrieval from the sample containers and/or sample racks. Sample containers and/or sample racks may be transported from an external sample loading area, by a component of the device or system, into the internal sample loading area. Sample containers and/or sample racks may be transported from the internal sample loading area to an external sample loading area, by a component of the device or system, e.g., after sample retrieval/extraction has been performed. In some instances, an internal sample loading area may be within the device, separated from one or more user accessible areas of the device, e.g., by a user access barrier. In some instances, the internal sample loading area may include all or a portion of (or be attached to all or a portion of) a user access barrier.

An internal sample loading area may include one or more internal sample loading positions. By "internal sample loading position" is generally meant a position within the device where a sample container and/or a sample rack rests. In some instances, sample may be retrieved or extracted from the sample container in the sample loading position. Sample loading positions may be dimensioned to receive a rack and internal sample loading areas may be dimensioned to receive a plurality of racks with a plurality of sample loading positions.

Internal sample loading positions may include a portion of a sample rack track. In some instances, an internal sample loading position may be paired with an external sample loading position such that the two positions are joined by a sample rack track. Accordingly, a sample rack may be transported along a sample rack track from an external sample loading position to an internal sample loading position or from an internal sample loading position to an external sample loading position.

A sample rack track may be continuous or discontinuous. In some instances, the internal portion of a sample rack track may include or overlap with components used in the subject methods, described herein, including e.g., imaging components, barcode readers, computer related elements, rack transport components, etc. For example, in some instances, a sample rack track may be interrupted by or overlap with a perpendicular track long which an imaging camera is transported.

The amount of the sample rack track that is present in the internal sample loading area may vary and may include e.g., more than 75% of the sample rack track, less than 75% of the sample rack track, more than half of the sample rack track, about half of the sample rack track, less than half of the sample rack track, more than 25% of the sample rack track, less than 25% of the sample rack track, and the like. The remaining portion, i.e., the portion of the sample rack track not within the internal sample loading area, may be present within an external sample loading area.

Any convenient mechanism (e.g., electromechanical mechanism) for transporting the rack between the external area to the internal area may be employed, including but not limited to e.g., a conveyor belt or controllable rollers, a component (e.g., an arm) that pushes, pulls, lifts, grabs, hooks or otherwise contacts the rack, and the like. In some embodiments, the device includes an arm that hooks a portion of or a component (e.g., tab or notch) on the rack to push and/or pull the rack between the internal and external loading positions. The rack transport mechanism may be driven using any convenient electromechanical drive including but not limited to e.g., a stepper motor.

An internal sample loading area may be dimensioned to receive a sample rack or may be dimensioned to receive a plurality of sample racks. For example, the number of sample racks an internal sample loading area may be configured to receive may vary and may range from one to 50 or more, including but not limited to e.g., 1 to 40, 1 to 30, 1 to 20, 1 to 15, 1 to 12, 1 to 10, 1 to 5, 2 to 40, 2 to 30, 2 to 20, 2 to 15, 2 to 12, 2 to 10, 2 to 5, 5 to 40, 5 to 30, 5 to 20, 5 to 15, 5 to 12, 5 to 10, etc. Depending on the number of sample containers that may be held by each individual sample rack and the maximal number of racks an internal sample loading area, in some instances, the number of samples that can be introduced into an internal sample loading area at one time may be 10 or more, including but not limited to e.g., 20 or more, 30 or more, 40 or more, 50 or more, 60 or more, 70 or more, 80 or more, 90 or more, 100 or more, 110 or more, 120 or more, 130 or more, 140 or more, 150 or more, 160 or more, 170 or more, 180 or more, 190 or more, 200 or more, etc.

An internal sample loading area may include one or more sample rack lanes that may or may not include walls along the sides of the lanes and/or dividers between the lanes, e.g., to facilitate alignment of a sample rack within a lane. In some instances, the lanes within an internal sample loading area may not include lane walls or dividers. Where present, such lane dividers may vary in size, shape and dimensions. In some instances, the divider lanes may extend the entire length of the sample rack lane. In some instances, the divider lanes may extend less than the entire length of the sample rack lane, including e.g., more than half the length of the sample rack lane, less than half the length of the sample rack lane, and the like. In some instances, the divider lanes may extend the entire height of the sample rack. In some instances, the divider lanes may extend less than the entire height of the sample rack, including e.g., more than half the height of the sample rack, less than half the height of the sample rack, and the like. In some instances, the individual teeth or fins of a comb structured user access barrier may serve as lane dividers in an internal sample loading area.

In some embodiments, one or more, including all, of the internal sample loading positions of an internal sample loading area may include a sensor that detects the presence of a sample rack in the internal sample loading position. For example, where a plurality of sample loading positions are present in a subject internal sample loading area each sample loading position may include a sensor that detects the presence of a sample rack in the internal sample loading position. Any convenient sensor may be employed including but not limited to e.g., a physical sensor (e.g., limit switch), a photoelectric or other optical sensor, an inductive sensor, an ultrasonic sensor, a capacitive sensor, a pressure sensor, and RFID-based sensor, etc.

In some instances, the internal loading area may be configured to align with one or more components of an external loading area. For example, internal and external portions of sample rack tracks may be aligned, lane dividers may be aligned, etc. In some instances where the external sample loading area includes a foldable shelf, the opening of the internal sample loading area may be configured such that when the shelf is in the closed position the opening is covered. In some instances, the internal sample loading area may include one or more sensors to indicate whether an external sample loading shelf is in an open or closed configuration.

Sample Racks

As summarized above, the subject devices and systems may make use of one or more sample racks. As used herein, the term "sample rack" generally refers to a holder for a sample container. Sample racks may hold a single sample container or a plurality of sample containers, where the number of sample containers held by a subject sample rack will vary and may include but is not limited to e.g., one to 50 or more, including but not limited to e.g., 1 to 40, 1 to 30, 1 to 20, 1 to 15, 1 to 12, 1 to 10, 1 to 5, 2 to 40, 2 to 30, 2 to 20, 2 to 15, 2 to 12, 2 to 10, 2 to 5, 5 to 40, 5 to 30, 5 to 20, 5 to 15, 5 to 12, 5 to 10, 1, 2, 3, 4, 5, 6, 7, 8, 9, 10, 11, 12, 13, 14, 15, 16, 17, 18, 19, 20, 21, 22, 23, 24, 25, etc. A sample rack will generally include one or more slots that each holds a sample container, where the number of slots in the rack will be consistent with the number of sample containers the rack is configured to hold.

Slots present in sample racks may be dimensioned to receive a plurality of different sample containers including e.g., sample tubes, sample vials, sample cups, etc. Slots present in sample racks may be dimensioned to receive a plurality of different sample containers within each category of sample container, e.g., a plurality of different sample tubes, a plurality of different sample vials, a plurality of different sample cups, etc. In some instances, slots present in a sample rack may be dimensioned to receive a plurality of different sample tubes.

Sample containers, that the slots of a sample rack may be dimensioned to receive, may vary in various dimensions, including width, height, diameter, etc. For example, lengths of such sample containers may range from 5 to 500 mm or more, e.g., from 5 mm to 40 mm, from 40 mm to 80 mm, from 80 mm to 110 mm, form 90 mm to 200 mm, and from 200 mm to 500 mm and the diameters may range from range from 3 mm to 100 mm or more, e.g., from 3 mm to 15 mm, from 3 mm to 20 mm, from 10 mm to 20 mm, from 15 mm to 30 mm, form 30 mm to 100 mm, and from 90 mm to 100 mm, respectively.

For example, in some instances, a slot may be dimensioned to receive a 1.5 mL or 2.0 mL tube including where the slot is 40 mm long or longer and 11 mm in diameter or more. In some instances, a slot may be dimensioned to receive a 0.5 mL tube including where the slot is 30 mm long or longer and 8 mm in diameter or more. In some instances, a slot may be dimensioned to receive a 5 mL tube including where the slot is 75 mm long or longer and 12 mm in diameter or more. In some instances, a slot may be dimensioned to receive a 13 mL or 14 mL tube including where the slot is 100 mm long or longer and 18 mm in diameter or more. In some instances, a slot may be dimensioned to receive a 15 mL tube including where the slot is 120 mm long or longer and 17 mm in diameter or more. In some instances, a slot may be dimensioned to receive a 50 mL tube including where the slot is 115 mm long or longer and 30 mm in diameter or more.

In some instances, a slot may be dimensioned to receive a hematology or blood collection tube, including but not limited to e.g., those having a diameter ranging from 10 mm to 16 mm (including from 13 mm to 16 mm) and a length ranging from 47 mm to 125 mm (including from 75 mm to 100 mm), and the like.

Sample containers for which slots of a sample rack may be dimensioned may vary in shape and the presence or absence of various features. For example, sample containers may be essentially cylindrical, partially cylindrical, essentially conical, partially conical (e.g., conical bottom), rounded (e.g., round bottom), and the like. Sample containers may have an upper lip, e.g., a lip near the opening of the container. Sample containers may or may not have a sheath or skirt that extends from the bottom of the container. For example, where a sample container is a tube with a rounded or conical bottom, some tubes will have a sheath or skirt extends from the bottom of the tube to allow the tube to stand freely when placed on a flat surface. A sample container may or may not have a cap and may be referred to as "capped" or "uncapped" accordingly. In some instances, capped tubes will have a pierceable cap, such a pierceable rubber cap, a pierceable plastic cap (e.g., a low density plastic pierceable cap), and the like.

Figure 4:
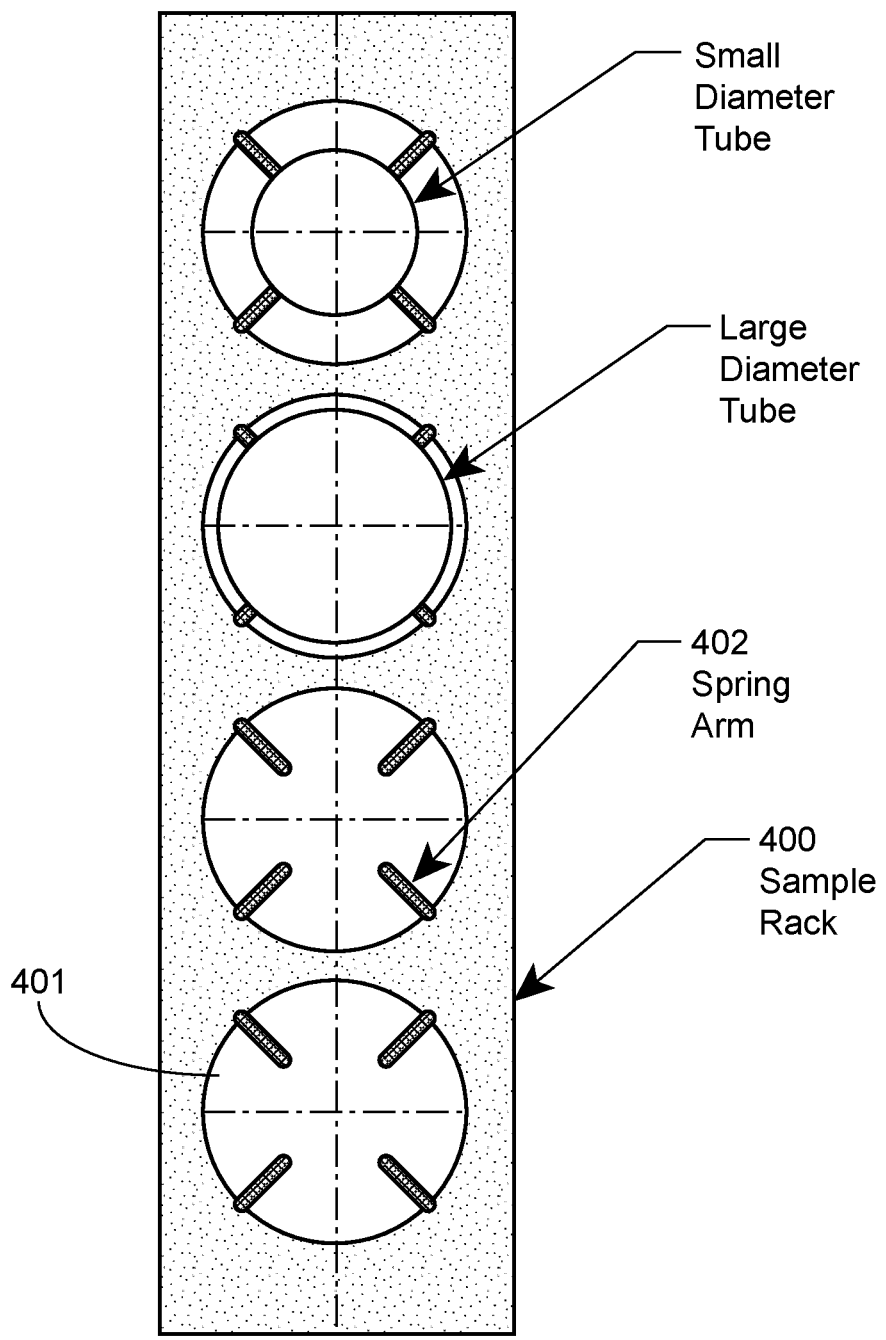
FIG. 4 provides a schematic representation of a top view of a sample rack having a plurality of slots for holding sample tubes.

Sample racks configured to hold a variety of different sample containers may include a device for centering the various sample containers, having different diameters, at the center of slot that receives the sample container. For example, the slot may include spring arms that center the sample container in the slot. Such spring arms may be arranged in various configurations including where anywhere from 2 to 10 or more (including 2 to 8, 2 to 6, 2 to 4, 3 or 4, etc.) spring arms are arranged within the slot. Turning to the embodiment of a sample rack depicted, from above, in FIG. 4, a sample rack (400) may have one or more slots (401) that receive sample tubes of various diameters, where each slot includes a plurality of spring arms (402) that center each tube within the slot.

A slot of a sample rack may also include a gap, slit, hole or window in a wall of the slot. Such a gap, slit, hole or window may find use in imaging a sample container present in the slot, e.g., where the camera images the sample container through the gap, slit, hole or window. In some instances, a gap, slit, hole or window may find use in imaging a component of the sample container, e.g., a barcode or other computer readable medium present on the sample container.

Figure 5:
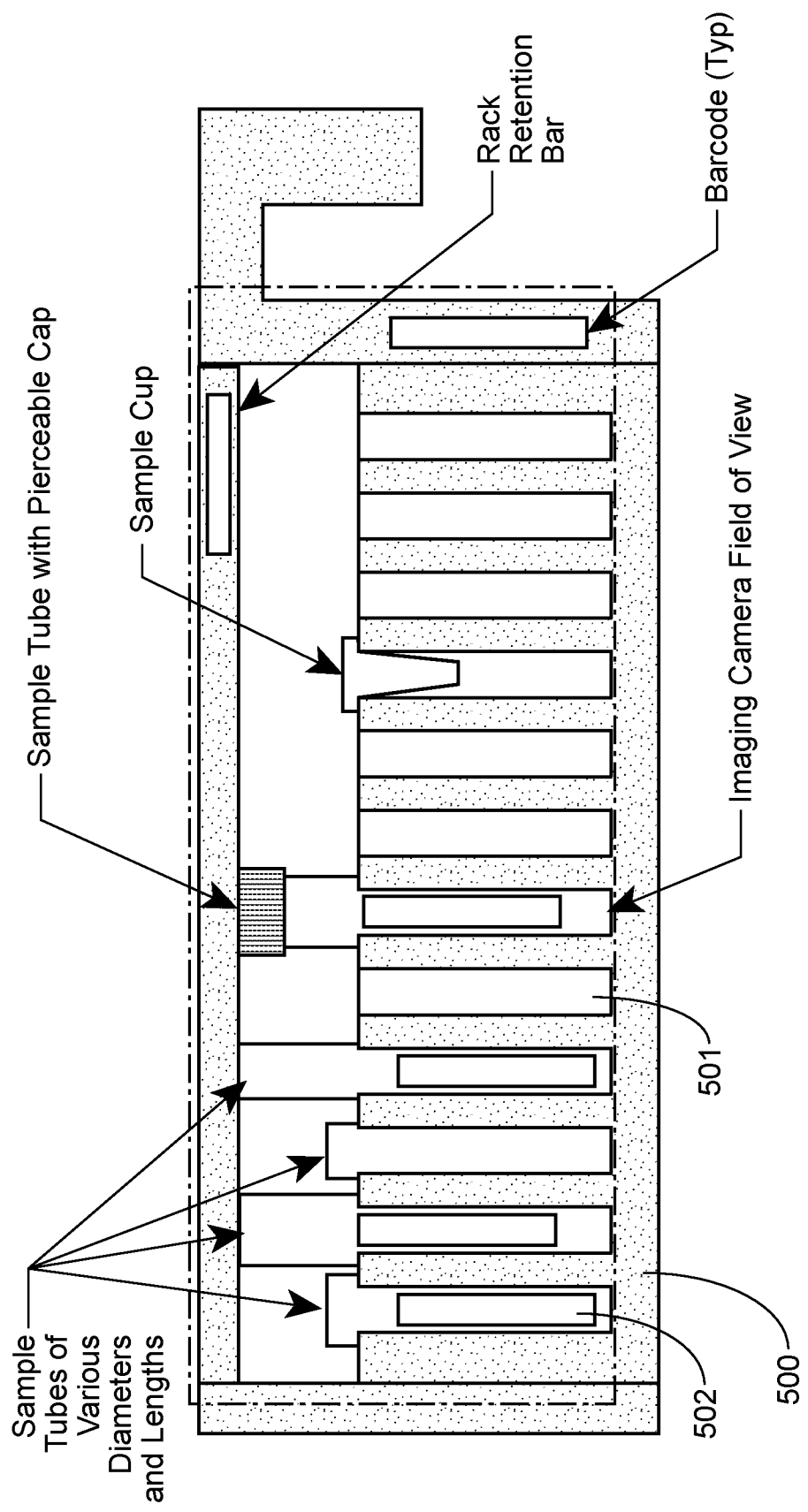
FIG. 5 provides a schematic representation of a side view of a sample rack having a retention bar and a plurality of slots some of which are pictured containing various different sample tubes.

Turning to the embodiment depicted in FIG. 5, a sample rack (500), pictured from the side, may include a gap (501) in each slot, through which portions of the various sample tubes may be imaged or a barcode (502) present on the sample tubes may be imaged or otherwise scanned. As depicted in FIG. 5, the imaging camera field of view may be configured, in some instances, to image both the portion of the tube visible through the gap as well as a portion of the tube that extends beyond the slot (if any), such as the portions of the longer tubes that are present above the top of the slots of the sample rack. As also depicted in FIG. 5, the imaging camera field of view may be configured, in some instances, to image a portion of the sample rack, including all or a portion of a removable part of the sample rack (such as the depicted rack retention bar).

A sample rack with one or more slots for receiving a sample container may include a first end that is inserted first into an automated processing device (i.e., a device-facing end) and a second end that may be handled by a user (i.e., a user-facing end) and is the last portion of the sample rack to travel into the automated processing device during loading. The sides of a sample rack may be essentially the same or different. For example, in some instances, a sample rack will include elements on one side of the rack that are present or absent on the other side of the rack. As an example, the rack may include elements on one side of the rack that interface with an imaging device that are not included on the other side of the rack that is no imaged.

Figure 6:
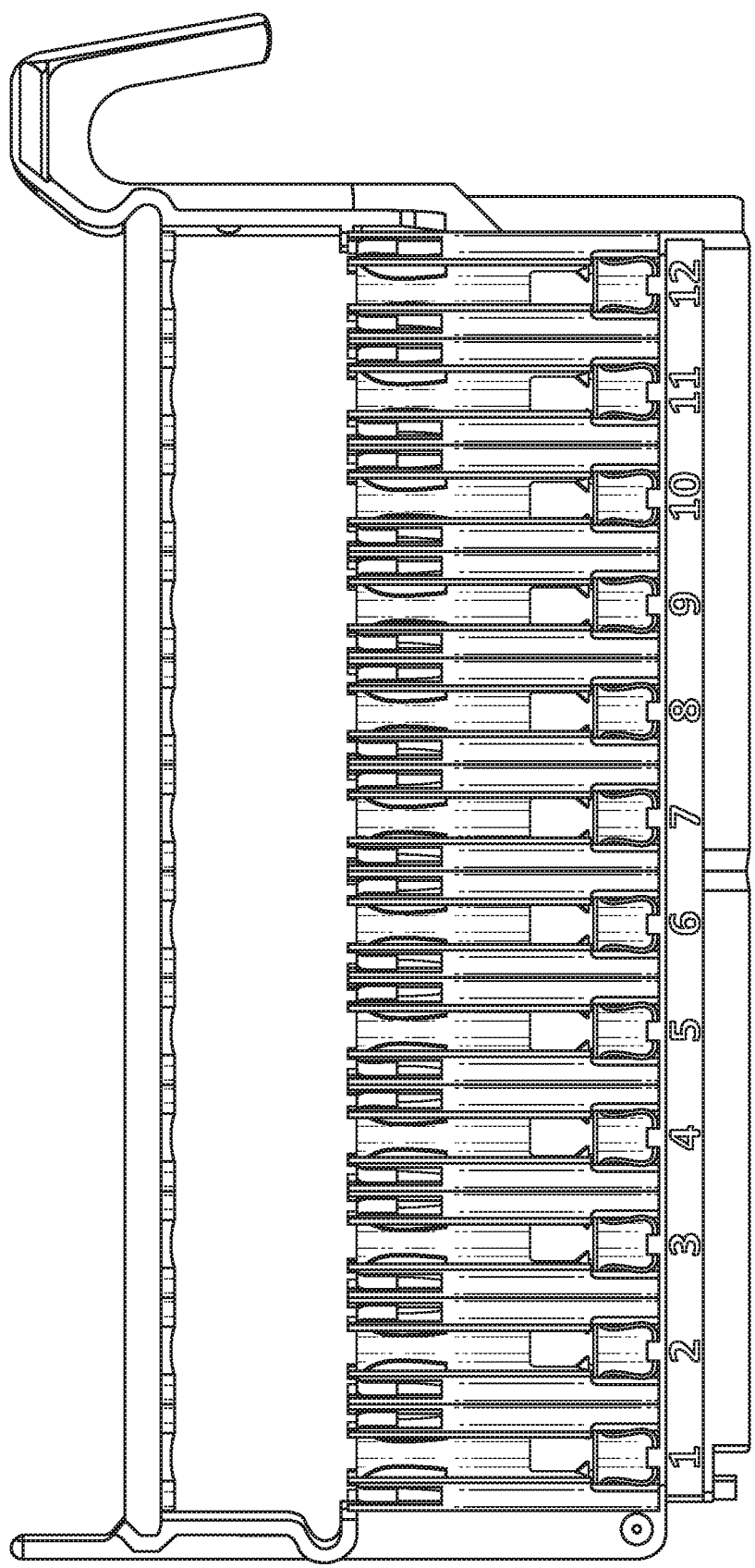
FIG. 6 depicts an embodiment of a sample rack, having a plurality of slots, as viewed from the side of the rack that is imaged by an imaging device.
Figure 8:
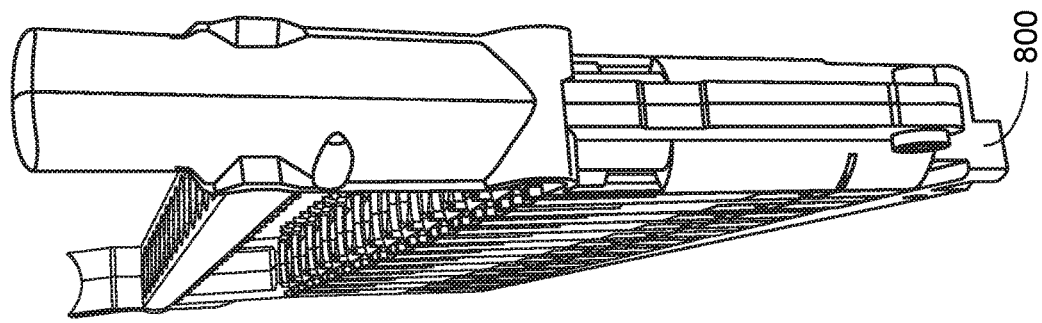
FIG. 8 depicts the device-facing end of a sample rack having a plurality of slots each for holding a sample container.
Figure 7:
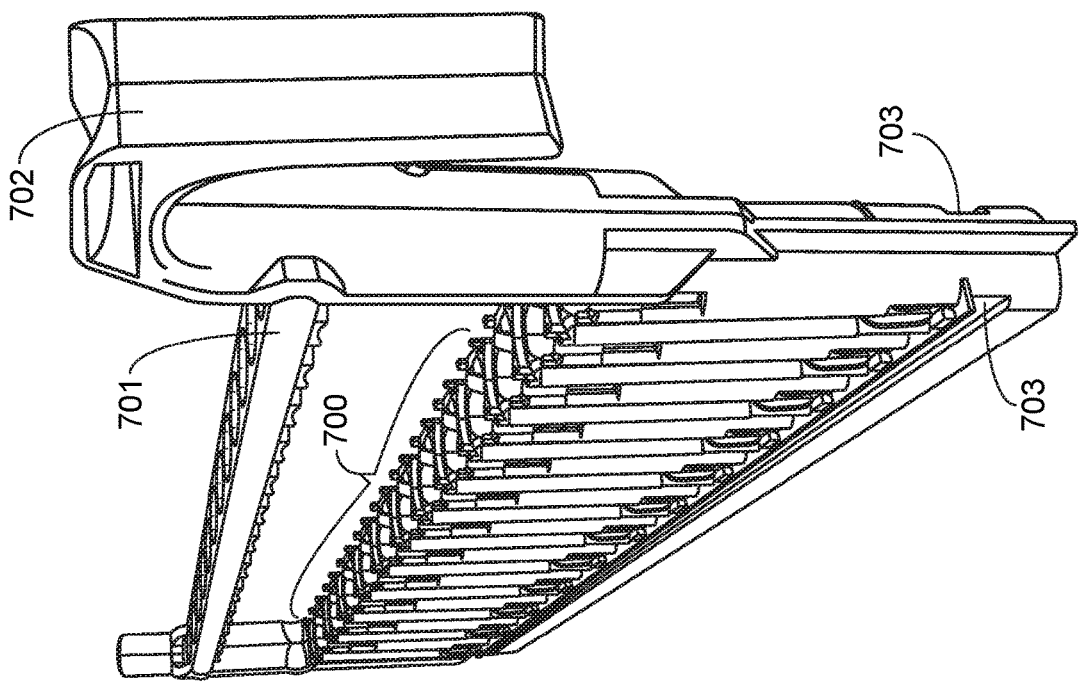
FIG. 7 depicts the user-facing end of a sample rack having a plurality of slots each for holding a sample container.

An embodiment of a sample rack, viewed from the side of that is imaged by an imaging device, is depicted in FIG. 6. Perspective drawings of the ends of the sample rack are provided in FIG. 7 and FIG. 8, where FIG. 7 provides a depiction of the user-facing end of the rack and FIG. 8 provides a depiction of the device-facing end of the rack. As can be seen in FIG. 7, the embodiment depicted includes a plurality of slots (700), a retention bar (701) and an element for user manipulation of the rack, in this case a handle (702). As can be seen in FIG. 8, the embodiment depicted includes an asymmetrical element on the device facing end, in this case a tab (800), useful for automated transporting of the rack into and out of the device via a electromechanical arm.

Figure 9:
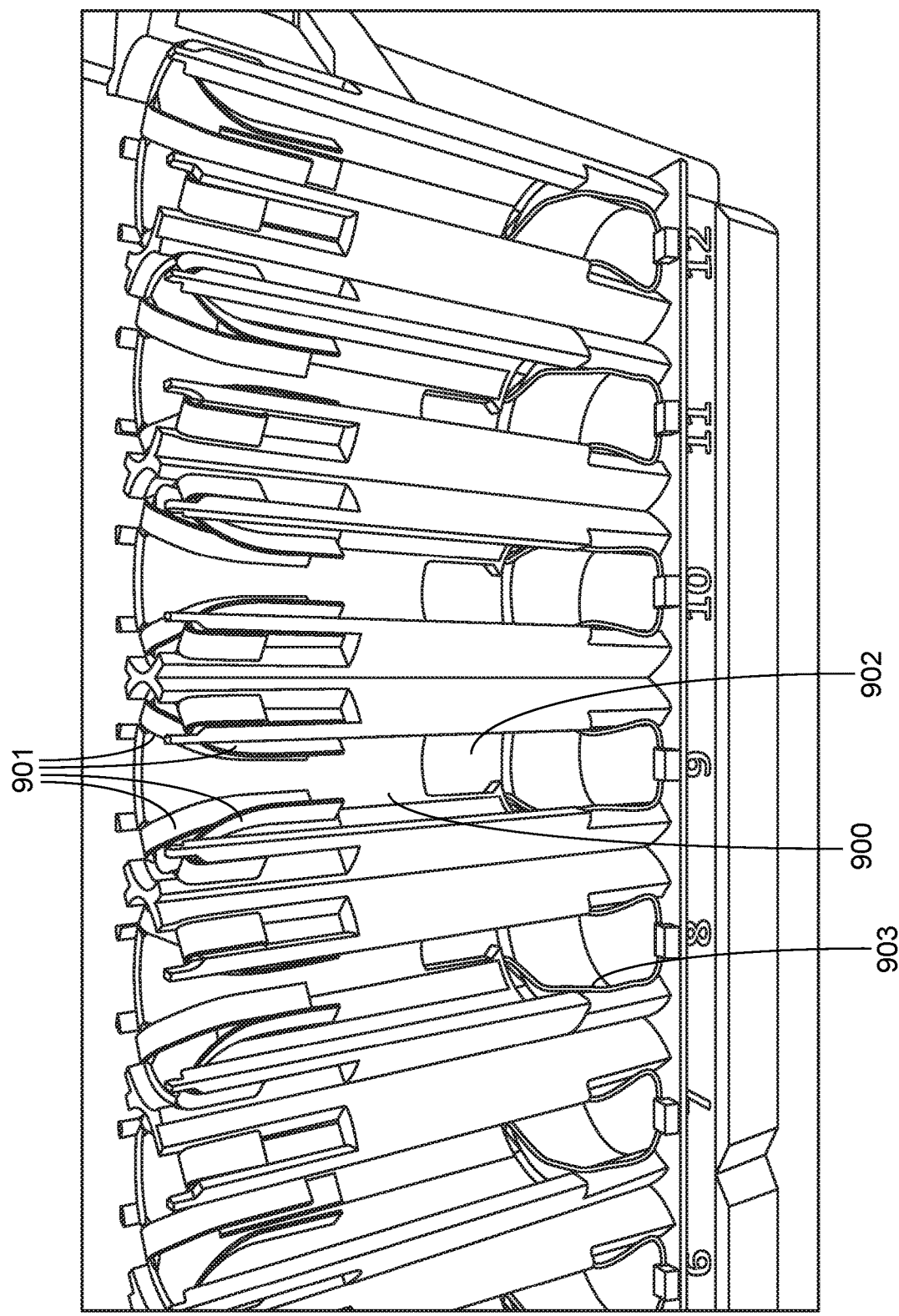
FIG. 9 depicts a zoomed-in view of the camera-facing side of a sample rack having a plurality of slots each for holding a sample container.

FIG. 9 provides a zoomed-in view from a side/top perspective to demonstrate elements of the rack slots present in the depicted embodiment. For example, each slot includes a gap (900) in the wall of the slot, allowing visualization, through the gap, of the sample container when present in the slot. Each slot of the embodiment further includes a plurality of metal springs (901) near the top of the slot which facilitate the centering of the sample container in the slot. Sample racks may or may not include an opening (902) in the slot in the side opposite the imaging side. Also depicted in FIG. 9, is an element in each slot that prevents sample containers with a bottom diameter above a certain threshold from reaching the bottom of the slot, which in this particular instance is a shaped wire (903).

In general, the slot of a sample rack may, in some instances, include essentially any internal ridge structure, where e.g., such an internal ridge is dimensioned to prevent a tube having a maximum bottom diameter above a threshold from contacting the bottom of the slot. In some instances, an internal ridge may be dimensioned to allow a tube having a maximum bottom diameter below a threshold to contact the bottom of the slot. In some instances, an internal ridge may be dimensioned such that tubes having a bottom sheath or skirt do or do not pass by the ridge to contact the bottom of slot. As depicted in FIG. 9, the ridge can be, but need not necessarily be constructed of a formed wire. For example, in some instances, an internal ridge may be constructed of plastic or resin or foam or any other suitable material, including e.g., where such a ridge is simply an extension of the internal face of the slot wall.

In general, any external element of the sample rack or added feature may be utilized in transporting the sample rack, e.g., from an external sample loading position to an internal sample loading position. For example, as depicted in FIG. 8, the device-facing end may include a tab or a notch that allows a transport mechanism to make contract (e.g., grab or hook) the rack for transport into or out of the device. For example, a transport mechanism may include an arm configured to engage a tab asymmetrically positioned on an end of the rack. Such a transport element present on the sample rack need not necessarily be present on the device-facing end and may be positioned on the user-facing end and/or one or both of the sides. A feature element of essentially any shape or design may be employed, depending on the context, provided that the element allows for the bi-directional transport of the sample rack where desired.

A sample rack may include an additional part or parts that may be permanently or removably attached to the sample rack. For example in some instances, the rack may include one or more elements for user manipulation of the rack, including but not limited to e.g., a handle, a hook, a grip, a friction surface, etc. In some instances, the rack may include one or more retention bars. In general, a retention bar may be employed for retaining a sample container or an element of a sample container placed in the sample rack. For example, in some instances, a retention bar may retain a sample container, a sample container cap or both when placed in a rack with the retention bar affixed. In some instances, a retention bar may be configured to retain a sample container or a cap of a sample container or both during sample extraction from the sample container, including e.g., where such extraction includes the piercing of a pierceable cap present on the sample container. Accordingly, in some instances, a retention bar may be specifically designed to withstand certain forces including e.g., the forces incurred during piercing of a pierceable cap and/or withdraw of the piercing device from the sample tube following sample extraction. In some instances, a subject retention bar may be removable.

In some instances, the sample rack may be configured such that forces applied to the sample rack by a sample retrieval means (e.g., a retrieval device including e.g., a computer controlled retrieval device) do not result in significant movement of the rack. For example, the sample rack may be configured to resist movement when vertical forces are applied to the rack by a sample retrieval means, e.g., vertical forces as a result of piercing of a pierceable cap of a tube present in the rack. In some instances, such vertical forces may be transferred from the sample retrieval means to the tube (e.g., through an attached pierceable cap attached to the tube) and from the tube to the rack through a retention bar present on the rack. Vertical forces that may be applied by a sample retrieval means include e.g., downward vertical force and/or upward vertical force. Downward vertical force may be introduced when the sample retrieval means is inserted into a sample container. Upward vertical force may be introduced when the sample retrieval means is retracted from a sample container, including e.g., those caused by friction between the sample retrieval means and the sample container and/or a cap present on the sample container. The tube rack may also be configured to resist one or more lateral forces.

In some instances, the rack may include one or more elements for resisting movement of the rack, including but not limited to e.g., a groove, a tab, a rail, a notch, etc. In some instances, such an element (i.e., a movement resisting element) may interface with a component of or an element present in the sample rack lane (including e.g., a component of or an element present in an internal sample loading position of a sample rack lane). In some embodiments, a sample rack may include one or more groove elements, such as e.g., one or more grove elements (703) as illustrated in the sample rack depicted in FIG. 7. In some instances, a sample rack lane may include one or more elements (e.g., tabs, rails, notches, grooves, etc.) configured to interface with one or more movement resisting elements present on the tube rack, where such interfacing prevents movement of the tube rack. For example, a sample rack lane or portion thereof (including e.g., the internal portion thereof) may include one or more rails configured to nest within the one or more grooves of the tube rack when the tube rack is present in the sample rack lane or the portion of the sample rack lane having the one or more rails. Configurations of movement resisting elements present on a tube rack and/or sample rack lane for preventing the movement of the tube rack may vary. For example, in some instances, a sample rack lane may include a groove that aligns with a rail or a series of tabs present on the rack such that, when aligned, the combination of elements between the lane and the rack resist movement of the rack within the lane.

Sample racks and/or the removable parts thereof may be constructed of any convenient and appropriate material, including e.g., metals, glass, plastics, resins, and the like. Useful materials include but are not limited to e.g., those polymeric materials, e.g., plastics, resins, etc., that are commonly used in research and industrial settings, including but not limited to: acetal, cyclic olefin copolymer, ethylene propylene diene monomer rubber, ethylene propylene rubber, ethylene-chlorotrifluoroethylene copolymer (Halar®), ethylene-tetrafluoroethylene (Tefzel), fluorinated ethylene propylene (Teflon®), fluorinated polyethylene, high impact polystyrene, high-density polyethylene, low-density polyethylene, modified polyphenylene ether, Permanox, polycarbonate, polyetherimide, polyethylene teraphthalate, polyethylene terephthalate copolymer, polyfluoroalkoxy (Teflon®), polymethyl methacrylate (acrylic), polymethylpentene, polypropylene, polypropylene copolymer, polystyrene, polysulfone, polyvinylidenedifluoride, ResMer™, styrene acrylonitrile, tetrafluoroethylene, tetrafluoroethylene (Teflon®), Thermanox, thermoplastic elastomer, thermoplastic polyester polyurethane, Tritan™, and the like.

Imaging Components and Barcode Readers

As summarized above, the systems and devices of the present disclosure will generally include an imaging component used in generating an image of one or more sample containers or a portion thereof and/or a sample rack, e.g., holding one or more sample containers, or a portion thereof. Such an imaging component may be an image capturing device including e.g., a digital camera capable of generating or capturing a digital image.

Suitable image capturing devices include a monochrome and color digital cameras capable of capturing a digital image and a means of storing the digital monochrome or color image and/or transferring the image to attached image processing circuitry or to an attached storage device for later transfer to image processing circuitry. Suitable digital cameras will vary and will generally include any digital camera (e.g., with one or more CCD sensors, CMOS sensors, InGaAs sensors and the like) with sufficiently high resolution and sufficient color capture to capture an image that may be processed according to the methods described herein. Depending on the particular features used in a subject method suitable digital cameras may include a monochrome or color camera with resolution ranging from less than about 0.3 megapixel to about 14.0 megapixel or more including but not limited to e.g., 0.3 megapixel or more, 0.9 megapixel or more, 1.3 megapixel or more, 1.4 megapixel or more, 2 megapixel or more, 3 megapixel or more, 3.3 megapixel or more, 5 megapixel or more, 7 megapixel or more, 10 megapixel or more, 12 megapixel or more, 14.0 megapixel or more, and the like.

Suitable digital cameras include but are not limited to e.g., custom build digital cameras, consumer grade digital cameras (e.g., consumer grade digital cameras converted for use in the herein described methods), machine vision systems and those digital cameras commercially available from various manufactures including but not limited to e.g., Aberlink, Allied Vision Technologies, Bass Electronics, Inc., Baumer Group, COGNEX, Dalsa, Datalogic Automation, Extronics Ltd UK, IDS Imaging Development Systems, IMPERX, InfraTec GmbH Infrarotsensorik and Messtechnik, Lambert Instruments, Leica, Lenox Instrument Company, Inc., Lumenera, Machine Vision Plus, MATRIX VISION GmbH, Micro Photonics, MICRO-EPSILON, Microscan Systems, NATIONAL INSTRUMENTS, Odos Imaging, Olympus, Photonfocus, Photonic Science Limited, PixeLINK, SMARTEK Vision, SVS-VISTEK GmbH, Vieworks Co., Ltd., VISION & CONTROL, Vision Components, viZaar industrial imaging AG, XENICS, Zeiss, and the like.

In some embodiments, an image capturing device of a subject system may be a mobile image capturing device. For example, a digital camera may be connected to or otherwise operably attached to a conveyance for moving the camera. In some embodiments a digital camera may be connected to a conveyor that conveys the camera to various imaging positions, including e.g., imaging positions adjacent to one or more sample rack tracks. Any convenient and appropriate means of conveyance may be employed including e.g., belt drives, stepper motors, actuators (e.g., pneumatic linear actuators, hydraulic linear actuators, electrical linear actuators and the like), the like and combinations thereof. In some instances, the conveyor transports the attached camera linearly along a path or track. In some instances, a conveyor of an imaging device may have one or more built-in or programed stops or stopping points that correspond to imaging positions of the system. For example, a stop built-in or programmed into a camera conveyor may cause the camera to stop along a path at an imaging position that is adjacent to a sample rack track or otherwise in sufficient proximity for imaging of a sample rack during transport along a sample rack track.

Figure 10:
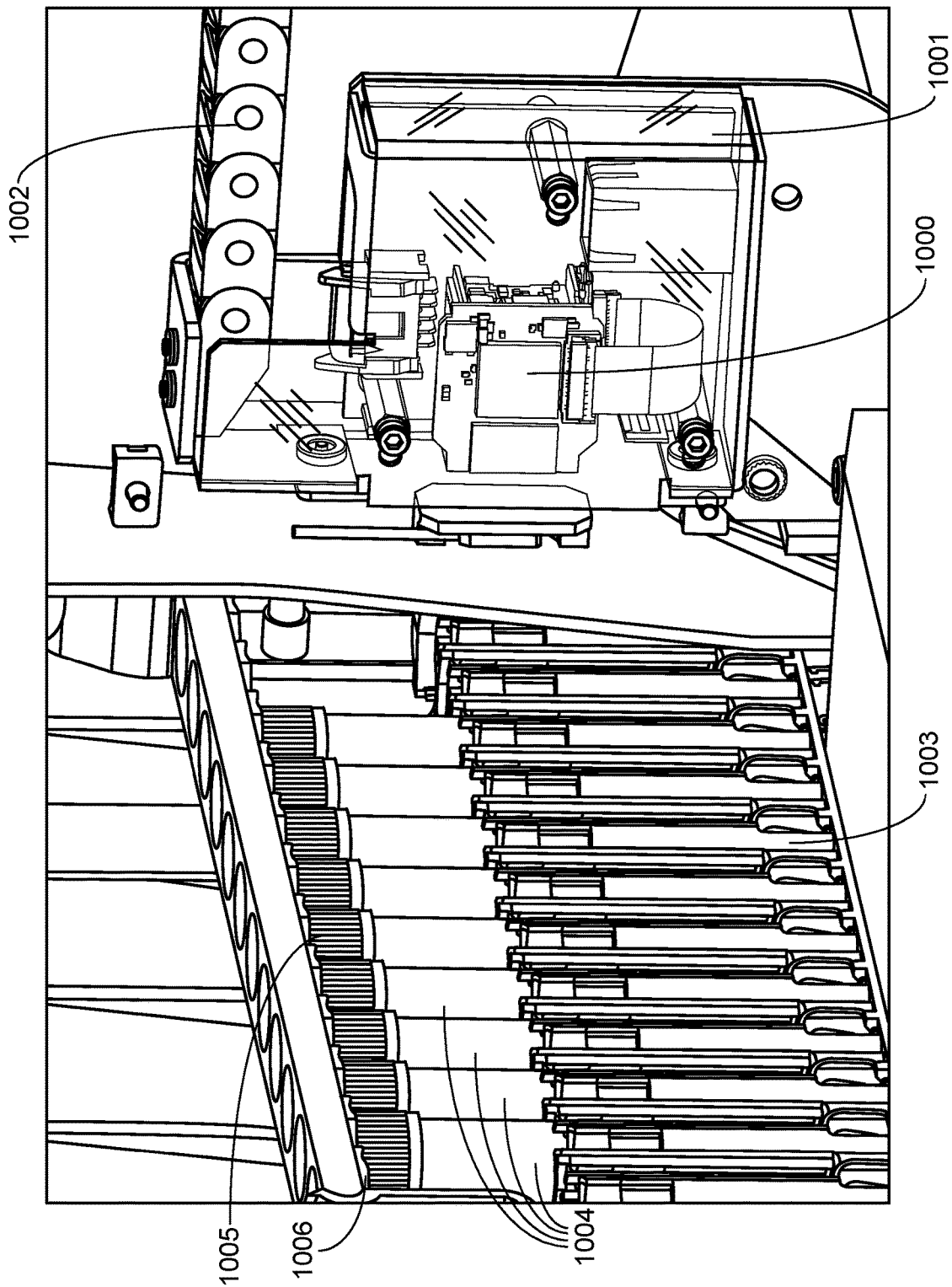
FIG. 10 depicts a moveable camera subsystem according to an embodiment described herein.

An embodiment of a moveable camera subsystem is depicted in FIG. 10. The depicted embodiment includes a camera (1000) contained within a housing (1001), made transparent in FIG. 10 to allow the camera (1000) to be seen, affixed to a belt (1002) driven conveyor for conveying the camera to various imaging positions. In the embodiment depicted a tube rack (1003) is shown containing tubes (1004) with caps (1005) and a retention rack (1006). The tube rack is depicted as passing, adjacent to the camera, from an external loading area into an internal sample loading area.

Figure 11:
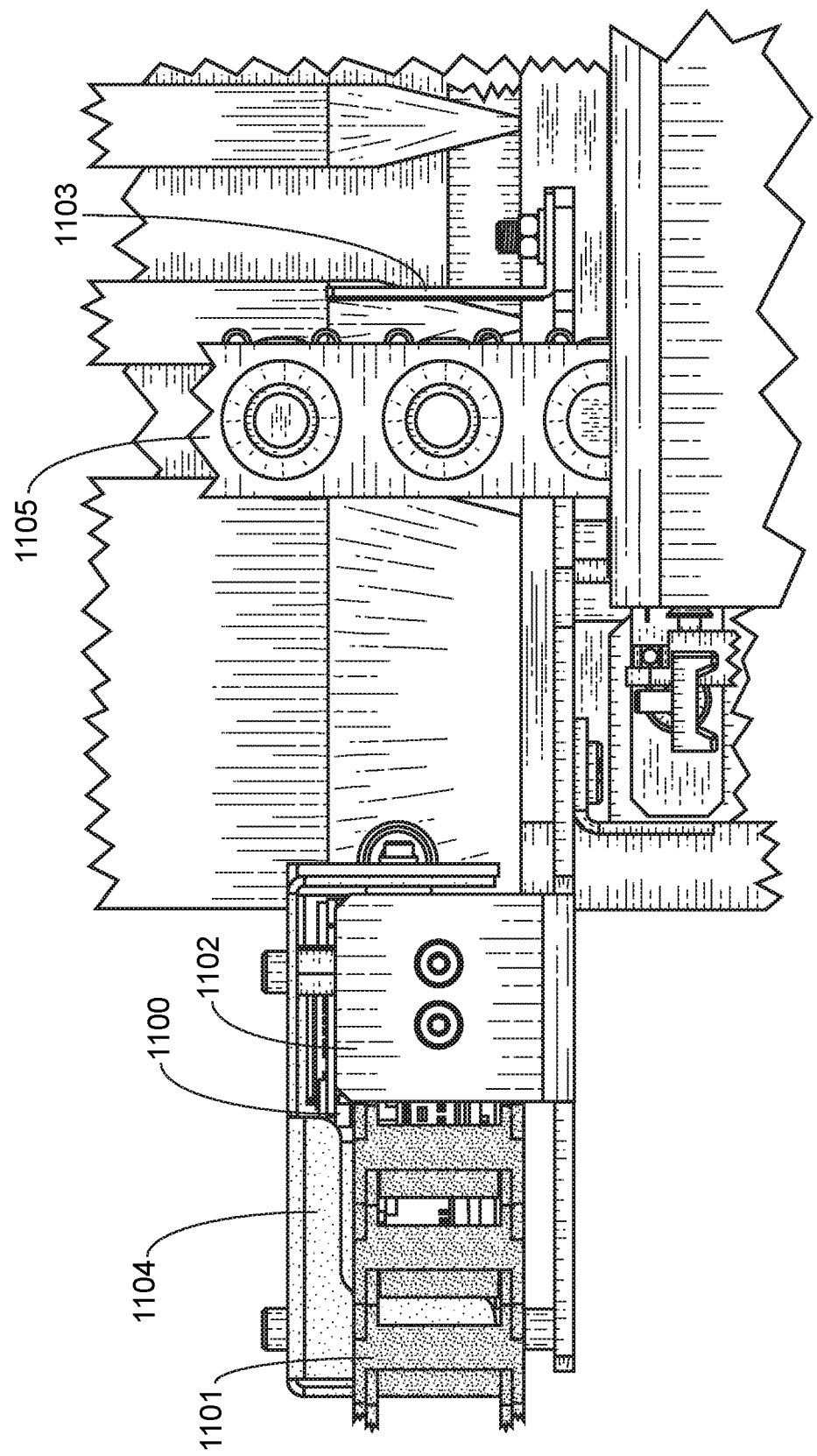
FIG. 11 depicts a top view of moveable camera subsystem according to an embodiment described herein.

A top view of an embodiment of a moveable camera subsystem is provided in FIG. 11, showing the camera (1100) within the camera housing (1104) affixed to the belt (1101) driven conveyor via a mounting plate (1102). In the embodiment depicted the mounting plate (1102) is configured with an attached imaging background (1103). In the embodiment depicted the mounting of the camera housing and the imaging background allow the camera and the background to be conveyed in unison such that a desired background is provided to the camera during imaging regardless of movement of the camera. In the configuration depicted, the mounting plate (1102) extends from the camera housing across and under the track taken by the tube rack (1105), allowing the imaging background to be positioned behind the tube rack, i.e., on the opposite side of the tube rack track, in relationship to the camera. As will be readily understood, useful mounting plates will include those that consist of a single piece (e.g., a single formed piece of desired material, e.g., metal, plastic, resin, etc.) of multiple pieces of the same or different materials joined in a desired configuration. While in the embodiment depicted in FIG. 11 the imaging background (1103) is physically joined with the camera (1100) via the mounting plate (1102), it will be readily understood that other configurations may be employed, including e.g., where the moveable camera subsystem and the moveable imaging background are separately moveable but their movements are coordinated such that the imaging background is properly positioned during imaging.

Figure 12:
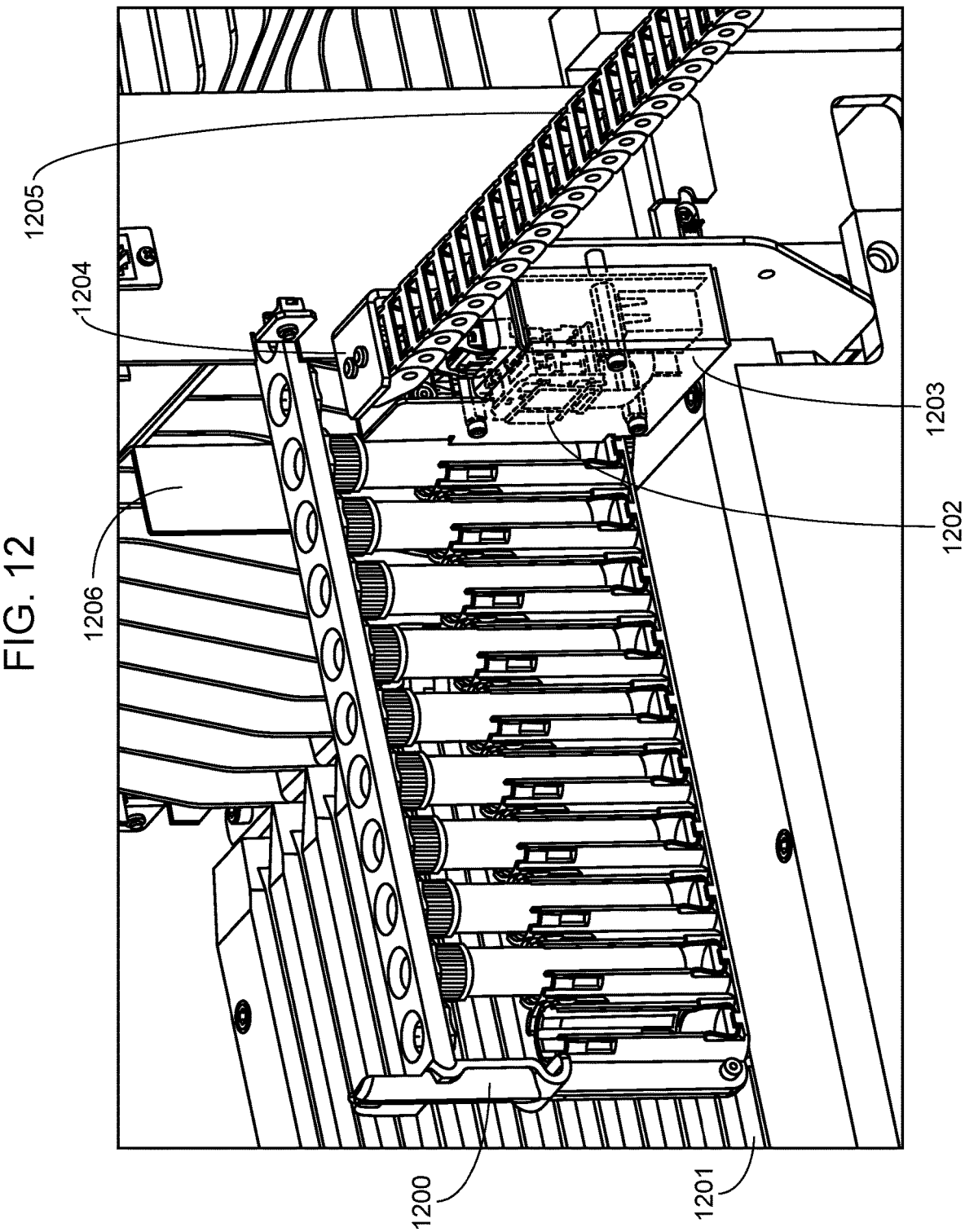
FIG. 12 provides a depiction of a moveable camera subsystem imaging a rack being loaded into the system.
Figure 13:
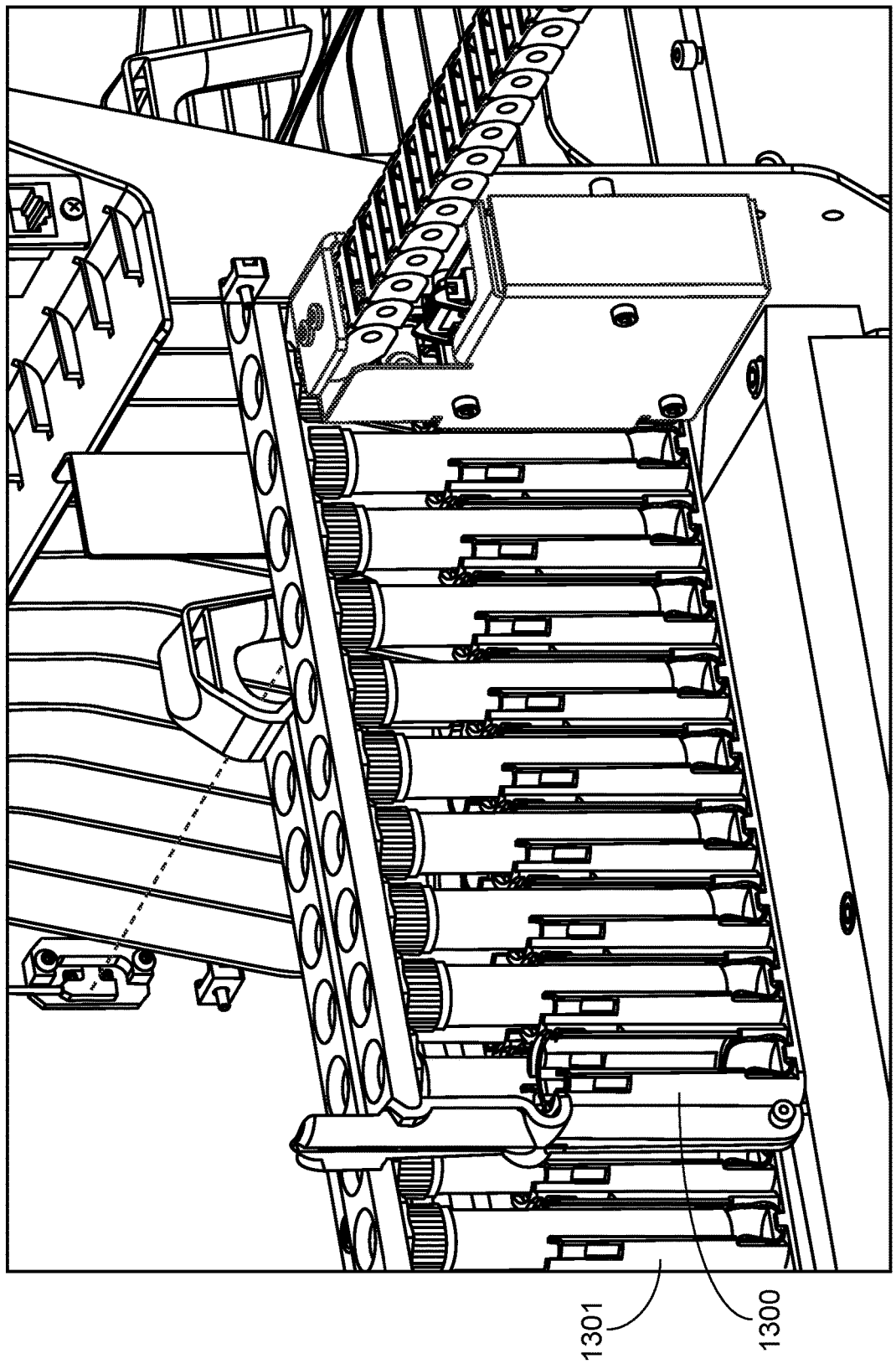
FIG. 13 provides a depiction of a moveable camera subsystem imaging a rack being loaded into the system with a second rack already loaded into the system.

FIG. 12 and FIG. 13 provide wide-angle side views of an embodiment of the belt-driven moveable camera subsystem. In FIG. 12 only one tube rack (1200) is depicted, positioned in the rack track (1201) closest to the observer. In the view provided in FIG. 12, the relative positions and orientations of the camera (1202), housing (1203), mounting plate (1204), belt drive (1205), tube rack (1200) and imaging background (1206) can be seen. In FIG. 13 two tube racks (1300) and (1301) are depicted, each positioned in a corresponding rack track. As can be seen in FIG. 13, the system is configured such that the already loaded rack (1301), i.e., a rack that has already been transported into its final position within the sample loading area, does not interfere with positioning of the imaging background at a location desired for imaging of the tubes of the newly loaded rack (1300). Put another way, the system may be configured such that when in either or both of the external sample loading position or the internal sample loading position the sample racks do not interfere with travel of the moveable camera subsystem and/or the imaging background along the imaging camera track.

The field of view of digital cameras employed in the subject systems and devices may vary and/or be adjusted as desired. Similarly, the relative distance between the camera in the imaging position and the rack in the position to be imaged may be adjusted as desired. Accordingly, when in an imaging position associated with a sample rack, the field of view of a camera of a subject system may include the entire sample rack, less than the entire sample rack, all sample container positions of the sample rack, less than all of the sample container positions of the sample rack, one sample container position of the sample rack, one sample container, less than one sample container, etc. In some instances, the sample rack and/or the imaging camera may be moved to two or more imaging positions in order to capture images of all sample containers present in a sample rack. In some instances, a single imaging position may be sufficient for the imaging camera to capture images of all sample containers present in a sample rack.

As noted above, in some instances, an imaging system of the present disclosure may include a moveable background employed in providing a desirable background for imaging. In relationship to the camera used in imaging the tubes of a sample rack, the imaging background may be positioned behind the sample rack. Put another way, the system may be configured such that the imaging background and the camera are positioned on opposite sides of the track along which the tube rack travels. In some instances, an moveable imaging background may be maintained at a set or predetermined distance from the camera. For example, in the embodiments described above where the camera and the imaging background directly or indirectly share common mounting elements a set distance may be maintained between the camera and the imaging background by virtue of the mounting configuration. A imaging background may be employed to limit the depth of field of the camera, i.e., to prevent the camera from imaging objects (e.g., sample racks, sample tubes, barcodes, etc.) beyond a desired distance, e.g., beyond the sample tube rack being imaged. Any convenient material of any convenient color may be employed for use in a imaging background including e.g., painted and/or coated and non-painted and/or non-coated materials, such as metal, plastic, resin, etc. In some instances, the imaging background may be white. In some instances, the imaging background may be configured to prevent reflection and/or glare including e.g., where the imaging background has a matte finish and/or is coated or painted with an anti-glare and/or anti-reflection coating.

As summarized above, the systems and devices of the present disclosure may include a device for reading a machine-readable medium present on one or more sample containers or a portion thereof and/or a sample rack, e.g., holding one or more sample containers, or a potion thereof. Such machine-readable medium reading devices may include barcode scanners including e.g., those capable of 1D and/or 2D barcodes. Useful barcode readers include but are not limited to e.g., laser barcode readers and 2D barcode readers. Non-limiting examples of useful barcode readers include those available from commercial retailers such as e.g., Microscan Systems, Inc. (Renton, Wash.). In some instances, the camera utilized for capturing images of the sample rack and/or sample container employed in the subject method may also serve as a barcode reader. In some instances, the subject method may make use of a barcode reader separate from the camera utilized for capturing images of the sample rack and/or sample container.

A barcode present on a sample container or sample rack or any other component may be configured to contain essentially any type of desired data. In some instances, a barcode may serve simply to allow for detection of the component (e.g., sample container, sample rack, part of a sample rack, etc.) that the barcode is attached to. In some instances, a barcode may serve simply to allow for detection of the orientation of a component (e.g., sample container, sample rack, part of a sample rack, etc.) that the barcode is attached to. In some instances, other information may be extracted from the barcode including but not limited to e.g., sample information, assay information, etc.

Additional Components

As summarized above, the subject systems and devices may further include additional components, e.g., components in addition to the external sample loading area, internal sample loading area, imaging components and barcode-reading components described above.

In some embodiments, the subject systems and devices may include one or more additional sensors. Additional sensors may be employed for any number of purposes and/or to detect and/or verify the position of any component of the device. For example, sensors may be employed to sense when a sample loading lane is open, when a sample loading lane is unavailable, when a rack is properly placed in a sample loading area, when a rack is improperly placed in a sample loading area, when a rack is waiting to be imaged and/or scanned, when a rack has been imaged and/or scanned, when a rack is waiting to be further processes, when a rack has been processed, when a rack is ready to be unloaded or removed, when a rack has been improperly placed in a busy loading lane, when a user access barrier has been breached, when a component of the system (e.g., a loading shelf) is fully engaged, when a component of the system (e.g., a loading shelf) is not fully engaged, when one or more errors has occurred, when the system is busy, when the system is idle, when the system is in standby, and the like and combinations thereof.

Any convenient sensor may be employed for such purposes depending on the desired configuration, including but not limited to e.g., an electrical sensor, a physical sensor (e.g., limit switch), a photoelectric or other optical sensor, an inductive sensor, an ultrasonic sensor, a capacitive sensor, a pressure sensor, and RFID-based sensor, etc.

In some embodiments, the subject systems and devices may include one or more signal indicators, e.g., indicator lights. Signal indicators may be employed for communicating to a user any number of situations relevant to the device or system or any component thereof. For example, signal indicators may be employed to indicate when a sample loading lane is open, when a sample loading lane is unavailable, when a rack is properly placed in a sample loading area, when a rack is improperly placed in a sample loading area, when a rack is waiting to be imaged and/or scanned, when a rack has been imaged and/or scanned, when a rack is waiting to be further processes, when a rack has been processed, when a rack is ready to be unloaded or removed, when a rack has been improperly placed in a busy loading lane, when a user access barrier has been breached, when a component of the system (e.g., a loading shelf) is fully engaged, when a component of the system (e.g., a loading shelf) is not fully engaged, when one or more errors has occurred, when the system is busy, when the system is idle, when the system is in standby, and the like and combinations thereof. An example of one embodiment of indicators that can be employed in the systems and devices of the present disclosure is provided in FIG. 14.

In some instances, an indicator-sensor pair may be employed, e.g., where the sensor senses the subject condition and the indicator is employed to communicate the condition to a user. Indicator-sensor pairs may be employed for various purposes including but not limited to e.g., to sense and indicate a state of the sample rack, the external sample loading position, the internal sample loading position, the sample loading system or a combination thereof.

Computer Related Embodiments

As summarized above, the automated functions of the subject systems and devices may include one or more data processing units and/or computer-related elements to control electromechanical aspects of the system and/or perform various digital processing functions, such as e.g., image processing functions. Accordingly, many of the component elements described above may be operably connected (e.g., through a wired or wireless data connection) to one or more computer controllers.

In some instances, the components of the systems as described herein may be connected by a wired data connection. Any suitable and appropriate wired data connection may find use in connecting the components of the described systems, e.g., as described herein, including but not limited to e.g., commercially available cables such as a USB cable, a coaxial cable, a serial cable, a C2G or Cat2 cable, a Cat5/Cat5e/Cat6/Cat6a cable, a Token Ring Cable (Cat4), a VGA cable, a HDMI cable, a RCA cable, an optical fiber cable, and the like. In some instances, wireless data connections may be employed including but not limited to e.g., radio frequency connections (e.g., PAN/LAN/MAN/WAN wireless networking, UHF radio connections, etc.), an infrared data transmission connection, wireless optical data connections, and the like.

As summarized above, data processing functions that may be performed by a computing device include but are not limited to image processing functions. Useful image processing functions performed by a subject computing device, according to instructions stored on a memory, include but are not limited to e.g., image segmentation, identification of a ROI, extraction of an image data value from an image, a segment of an image or an ROI, and the like. From data extracted from a digital image a processor may perform one or more image analysis functions including but not limited to analysis of the type of sample container (e.g., sample tube) present in a slot of a sample rack, analysis of the size of a sample container present in a slot of a sample rack, analysis of whether a sample container is capped or uncapped, analysis of whether a removable part of the sample rack is necessary (e.g., whether the tubes present are capped or uncapped and thus whether a rack retention bar is necessary), analysis of whether a removable part of the sample rack is present or absent (e.g., whether a rack retention bar is present or absent), and the like.

As summarized above, the devices and systems of the instant disclosure may further include a "memory" that is capable of storing information such that it is accessible and retrievable at a later date by a computer. Any desired information may be stored on such a memory, including but not limited to e.g., instructions for image processing functions, instructions for image analysis functions, digital reference libraries (e.g., of data pertaining to various sample containers), captured images, and the like. Any convenient data storage structure may be chosen, based on the means used to access the stored information. In certain aspects, the information may be stored in a "permanent memory" (i.e. memory that is not erased by termination of the electrical supply to a computer or processor) or "non-permanent memory". Computer hard-drive, CD-ROM, floppy disk, portable flash drive and DVD are all examples of permanent memory. Random Access Memory (RAM) is an example of non-permanent memory. A file in permanent memory may be editable and re-writable.

Substantially any circuitry can be configured to a functional arrangement within the devices and systems for performing the methods disclosed herein. The hardware architecture of such circuitry, including e.g., a specifically configured computer, is well known by a person skilled in the art, and can comprise hardware components including one or more processors (CPU), a random-access memory (RAM), a read-only memory (ROM), an internal or external data storage medium (e.g., hard disk drive). Such circuitry can also comprise one or more graphic boards for processing and outputting graphical information to display means. The above components can be suitably interconnected via a bus within the circuitry, e.g., inside a specific-use computer. The circuitry can further comprise suitable interfaces for communicating with general-purpose external components such as a monitor, keyboard, mouse, network, etc. In some embodiments, the circuitry can be capable of parallel processing or can be part of a network configured for parallel or distributive computing to increase the processing power for the present methods and programs. In some embodiments, the program code read out from the storage medium can be written into a memory provided in an expanded board inserted in the circuitry, or an expanded unit connected to the circuitry, and a CPU or the like provided in the expanded board or expanded unit can actually perform a part or all of the operations according to the instructions of the programming, so as to accomplish the functions described.

In addition to the components of the devices and systems of the instant disclosure, e.g., as described above, systems of the disclosure may include a number of additional components, such as data output devices, e.g., monitors and/or speakers, data input devices, e.g., interface ports, keyboards, etc., actuatable components, power sources, etc.

The instant disclosure includes computer readable medium, including non-transitory computer readable medium, which stores instructions for methods, or portions thereof, described herein. Aspects of the instant disclosure include computer readable medium storing instructions that, when executed by a computing device, cause the computing device to perform one or more steps of a method as described herein.

In certain embodiments, instructions in accordance with the methods described herein can be coded onto a computer-readable medium in the form of "programming", where the term "computer readable medium" as used herein refers to any storage or transmission medium that participates in providing instructions and/or data to a computer for execution and/or processing. Examples of storage media include a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer.

The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A sample loading system comprising:
a plurality of pairs of sample loading positions, each pair of sample loading positions comprising an internal sample loading position that is inside an enclosure and an external sample loading position that is outside the enclosure, each sample loading position comprising a rack loading slot, wherein a sample rack is positioned thereon, the sample rack having a slot configured to receive a sample container, wherein the rack loading slot comprises an internal ridge dimensioned to: prevent a container having a maximum bottom diameter above a threshold from contacting the bottom of the sample container slot and allow a container having a maximum bottom diameter below a threshold to contact the bottom of the sample container slot;
a plurality of tracks, wherein each of the plurality of tracks links the external sample loading position to the internal sample loading position of a pair from the plurality of sample loading positions, wherein each track comprises a rack transport mechanism that automatically transports the sample rack between the external sample loading position and the internal sample loading position;
a camera connected to a conveyor that conveys the camera to an imaging position adjacent to each track such that the camera generates an image of the sample container when present in the slot; and
a computing device, operably connected to the camera, comprising a non-transitory computer readable medium storing instructions that, when executed by the computing device, cause the computing device to determine from the image:
a) the type of sample container present in the slot;
b) the size of the sample container present in the slot;
c) whether the sample container is capped or uncapped; or
d) a combination thereof.

2. The system according to claim 1, wherein the sample rack comprises a plurality of slots each dimensioned to receive a sample container.

3. The system according to claim 2, wherein the camera generates an image of each sample container, if present, in each of the plurality of slots during transport of the sample rack.

4. The system according to claim 3, wherein the conveyor pauses the transport of the sample rack during the generation of the image.

5. The system according to claim 1, wherein the sample rack comprises a removable part.

6. The system according to claim 5, wherein the non-transitory computer readable medium further stores instructions that, when executed by the computing device, cause the computing device to determine from the image whether the removable part is present or absent.

7. The system according to claim 6, wherein the removable part is a cap retention bar.

8. The system according to claim 1, wherein the sample loading system further comprises a user access barrier.

9. The system according to claim 8, wherein the user access barrier comprises a comb structure through which each rack passes during transport between the external loading position and the internal loading position.

10. The system according to claim 1, wherein external loading positions are present on a loading shelf that pivots between a closed loading position and an open loading position.

11. The system according to claim 10, wherein the loading shelf further comprises a loading shelf position indicator.

12. The system according to claim 1, wherein the non-transitory computer readable medium further stores instructions that, when executed by the computing device, cause the computing device to determine which of the plurality of slots contain a sample container.

13. The system according to claim 1, wherein the slot comprises a plurality of spring arms that center the sample container in the slot.

14. The system according to claim 1, wherein the internal ridge comprises a wire affixed to an internal wall of the slot.

15. The system according to claim 1, wherein the sample loading system comprises a barcode reader.

16. The system according to claim 15, wherein the barcode reader scans a barcode, when present, on the sample rack.

17. The system according to claim 15, wherein the barcode reader scans a barcode, when present, on the sample container.

18. The system according to claim 15, wherein the barcode reader is operably connected to a computing device comprising a non-transitory computer readable medium storing instructions that, when executed by the computing device, cause the computing device to obtain data from the barcode.

19. The system according to claim 18, wherein the data obtained from the barcode comprises sample information, assay information, or both.

20. The system according to claim 15, wherein the camera serves as the barcode reader.

21. The system according to claim 1, wherein a wall of the slot comprises a gap through which the camera images the sample container.

22. The system according to claim 1, wherein each external sample loading position further comprises a sensor that detects the presence of a sample rack in the external sample loading position.

23. The system according to claim 1, wherein each internal sample loading position further comprises a sensor that detects the presence of a sample rack in the internal sample loading position.

24. The system according to claim 1, wherein the rack transport mechanism comprises a stepper motor.

25. The system according to claim 23, wherein the rack transport mechanism comprises an arm that contacts and transports the sample rack from the external loading position to the internal loading position.

26. The system according to claim 24, wherein the arm is configured to engage a tab asymmetrically positioned on an end of the rack.

27. The system according to claim 25, wherein the arm contacts and transports the sample rack from the internal loading position to the external loading position.

28. The system according to claim 1, wherein the sample loading system further comprises an indicator light to provide feedback to a user.

29. The system according to claim 28, wherein the indicator light indicates a state of the sample rack, the external sample loading position, the internal sample loading position, the sample loading system or a combination thereof.

30. The system according to claim 1, wherein the sample loading system is operably connected to an automated sample processing device.

31. The system according to claim 30, wherein the sample loading system allows for loading of a sample into the automated sample processing device without interruption of the automated sample processing device.

32. The system according to claim 30, wherein the automated sample processing device comprises an automated sample analysis system.

33. The system according to claim 32, wherein the sample loading system allows for loading of a sample into the automated sample analysis system while the automated sample analysis system is performing an assay of a previously loaded sample.

* * * * *